US012351738B2

(12) United States Patent
Hampson et al.

(10) Patent No.: US 12,351,738 B2
(45) Date of Patent: Jul. 8, 2025

(54) BINDER COMPOSITIONS AND USES THEREOF

(71) Applicants: KNAUF INSULATION SPRL, Visé (BE); KNAUF INSULATION, INC., Shelbyville, IN (US)

(72) Inventors: Carl Hampson, Liverpool (GB); Ferdous Khan, St. Helens (GB)

(73) Assignees: Knauf Insulation, Inc., Shelbyville, IN (US); Knauf Insulation SPRL, Vise (BE)

(*) Notice: Subject to any disclaimer, the term of this patent is extended or adjusted under 35 U.S.C. 154(b) by 115 days.

(21) Appl. No.: 17/498,146

(22) Filed: Oct. 11, 2021

(65) Prior Publication Data

US 2022/0098452 A1 Mar. 31, 2022

Related U.S. Application Data

(63) Continuation of application No. 17/386,445, filed on Jul. 27, 2021, now abandoned, which is a continuation of application No. 17/323,991, filed on May 18, 2021, now abandoned, which is a continuation of application No. 17/194,269, filed on Mar. 7, 2021, now abandoned, which is a continuation of application No. 17/129,787, filed on Dec. 21, 2020, now abandoned, which is a continuation of application No. 17/063,630, filed on Oct. 5, 2020, now abandoned, which is a continuation of application No. 16/941,474, filed on Jul. 28, 2020, now abandoned, which is a continuation of application No. 15/931,565, filed on May 13, 2020, now abandoned, which is a continuation of application No. 15/326,532, filed as application No. PCT/EP2015/066455 on Jul. 17, 2015, now abandoned.

(30) Foreign Application Priority Data

Jul. 17, 2014 (GB) ..................... 1412709

(51) Int. Cl.
*C09J 103/02* (2006.01)
*B27K 3/02* (2006.01)
*B27N 3/00* (2006.01)
*C08L 3/02* (2006.01)
*C09J 101/26* (2006.01)
*C09J 101/28* (2006.01)
*C09J 105/08* (2006.01)
*C09J 131/04* (2006.01)
*C09J 179/02* (2006.01)

(52) U.S. Cl.
CPC ............ *C09J 101/286* (2013.01); *B27K 3/02* (2013.01); *B27N 3/002* (2013.01); *C08L 3/02* (2013.01); *C09J 101/26* (2013.01); *C09J 103/02* (2013.01); *C09J 105/08* (2013.01); *C09J 131/04* (2013.01); *C09J 179/02* (2013.01)

(58) Field of Classification Search
None
See application file for complete search history.

(56) References Cited

U.S. PATENT DOCUMENTS

| 1,801,052 A | 4/1931 | Meigs |
| 1,801,053 A | 4/1931 | Meigs |
| 1,886,353 A | 11/1932 | Novotny et al. |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace et al. |
| 2,261,295 A | 11/1941 | Schlack |
| 2,362,086 A | 11/1944 | Eastes et al. |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd et al. |

(Continued)

FOREIGN PATENT DOCUMENTS

| AU | 8538765 | 8/1985 |
| AU | 9640921 | 7/1997 |

(Continued)

OTHER PUBLICATIONS

Nov. 16, Office action for co-pending U.S. Appl. No. 15/326,532 (9 pages)—Nov. 16, 2018.
Office action for co-pending U.S. Appl. No. 15/326,532 (11 pages)—Mar. 14, 2019.
Office action for co-pending U.S. Appl. No. 15/326,532 (9 pages)—Aug. 6, 2019.

(Continued)

*Primary Examiner* — Katarzyna I Kolb
(74) *Attorney, Agent, or Firm* — Barnes & Thornburg LLP

(57) ABSTRACT

The present invention relates to new aqueous binder compositions comprising an aqueous curable binder composition comprising starting materials required for forming a thermoset resin upon curing and a matrix polymer, wherein the starting materials required for forming a thermoset resin upon curing comprise (i) a polyhydroxy component and a polycarboxylic acid component, or an anhydride, ester or salt derivative thereof and/or reaction product thereof, or (ii) a carbohydrate component and a nitrogen containing component and/or a reaction product thereof.

18 Claims, 6 Drawing Sheets

(56) References Cited

U.S. PATENT DOCUMENTS

| | | |
|---|---|---|
| 3,222,243 A | 12/1965 | Gaston et al. |
| 3,231,349 A | 1/1966 | Stalego |
| 3,232,821 A | 2/1966 | Banks et al. |
| 3,297,419 A | 1/1967 | Eyre, Jr. |
| 3,513,001 A | 5/1970 | Woodhead et al. |
| 3,551,365 A | 12/1970 | Matalon |
| 3,554,788 A * | 1/1971 | Fechillas ............... A61L 15/60 604/366 |
| 3,784,408 A | 1/1974 | Jaffe et al. |
| 3,791,807 A | 2/1974 | Etzel et al. |
| 3,802,897 A | 4/1974 | Voigt |
| 3,809,664 A | 5/1974 | Burr |
| 3,826,767 A | 7/1974 | Hoover et al. |
| 3,856,606 A | 12/1974 | Fan et al. |
| 3,867,119 A | 2/1975 | Takeo et al. |
| 3,907,724 A | 9/1975 | Higginbottom |
| 3,911,048 A | 10/1975 | Nistri et al. |
| 3,919,134 A | 11/1975 | Higginbottom |
| 3,922,466 A | 11/1975 | Bell et al. |
| 3,955,031 A | 5/1976 | Jones et al. |
| 3,956,204 A | 5/1976 | Higginbottom |
| 3,961,081 A | 6/1976 | McKenzie |
| 3,971,807 A | 7/1976 | Brack |
| 4,014,726 A | 3/1977 | Fargo |
| 4,028,290 A | 6/1977 | Reid |
| 4,048,127 A | 9/1977 | Gibbons et al. |
| 4,054,713 A | 10/1977 | Sakaguchi et al. |
| 4,085,076 A | 4/1978 | Gibbons et al. |
| 4,097,427 A | 6/1978 | Aitken et al. |
| 4,107,379 A | 8/1978 | Stofko |
| 4,109,057 A | 8/1978 | Nakamura et al. |
| 4,144,027 A | 3/1979 | Habib |
| 4,148,765 A | 4/1979 | Nelson |
| 4,183,997 A | 1/1980 | Stofko |
| 4,184,986 A | 1/1980 | Krasnobajew et al. |
| 4,186,053 A | 1/1980 | Krasnobajew et al. |
| 4,201,247 A | 5/1980 | Shannon |
| 4,201,857 A | 5/1980 | Krasnobajew et al. |
| 4,217,414 A | 8/1980 | Walon |
| 4,233,432 A | 11/1980 | Curtis, Jr. |
| 4,246,367 A | 1/1981 | Curtis, Jr. |
| 4,259,190 A | 3/1981 | Fahey |
| 4,265,963 A | 5/1981 | Matalon |
| 4,278,573 A | 7/1981 | Tessler |
| 4,296,173 A | 10/1981 | Fahey |
| 4,301,310 A | 11/1981 | Wagner |
| 4,310,585 A | 1/1982 | Shannon |
| 4,322,523 A | 3/1982 | Wagner |
| 4,330,443 A | 5/1982 | Rankin |
| 4,333,484 A | 6/1982 | Keritsis |
| 4,357,194 A | 11/1982 | Stofko |
| 4,361,588 A | 11/1982 | Herz |
| 4,379,101 A | 4/1983 | Smith |
| 4,393,019 A | 7/1983 | Geimer |
| 4,396,430 A | 8/1983 | Matalon |
| 4,400,496 A | 8/1983 | Butler et al. |
| 4,464,523 A | 8/1984 | Neigel et al. |
| 4,506,684 A | 3/1985 | Keritsis |
| 4,520,143 A | 5/1985 | Jellinek |
| 4,524,164 A | 6/1985 | Viswanathan et al. |
| 4,631,226 A | 12/1986 | Jellinek |
| 4,654,259 A | 3/1987 | Stofko |
| 4,668,716 A | 5/1987 | Pepe et al. |
| 4,692,478 A | 9/1987 | Viswanathan et al. |
| 4,714,727 A | 12/1987 | Hume, III |
| 4,720,295 A | 1/1988 | Bronshtein |
| 4,734,996 A | 4/1988 | Kim et al. |
| 4,754,056 A | 6/1988 | Ansel et al. |
| 4,761,184 A | 8/1988 | Markessini |
| 4,780,339 A | 10/1988 | Lacourse et al. |
| 4,828,643 A | 5/1989 | Newman et al. |
| 4,845,162 A | 7/1989 | Schmitt et al. |
| 4,906,237 A | 3/1990 | Johansson |
| 4,912,147 A | 3/1990 | Pfoehler et al. |
| 4,918,861 A | 4/1990 | Carpenter et al. |
| 4,923,980 A | 5/1990 | Blomberg |
| 4,950,444 A | 8/1990 | Deboufie et al. |
| 4,988,780 A | 1/1991 | Das et al. |
| 4,992,519 A | 2/1991 | Mukherjee |
| 5,001,202 A | 3/1991 | Denis et al. |
| 5,013,405 A | 5/1991 | Izard |
| 5,032,431 A | 7/1991 | Conner et al. |
| 5,037,930 A | 8/1991 | Shih |
| 5,041,595 A | 8/1991 | Yang et al. |
| 5,089,342 A | 2/1992 | Dhein et al. |
| 5,095,054 A | 3/1992 | Lay et al. |
| 5,106,615 A | 4/1992 | Dikstein |
| 5,114,004 A | 5/1992 | Isono et al. |
| 5,123,949 A | 6/1992 | Thiessen |
| 5,124,369 A | 6/1992 | Vandichel et al. |
| 5,128,407 A | 7/1992 | Layton et al. |
| 5,143,582 A | 9/1992 | Arkens et al. |
| 5,151,465 A | 9/1992 | Le-Khac |
| 5,167,738 A | 12/1992 | Bichot et al. |
| 5,198,492 A | 3/1993 | Stack |
| 5,217,741 A | 6/1993 | Kawachi et al. |
| 5,218,048 A | 6/1993 | Abe et al. |
| 5,240,498 A | 8/1993 | Matalon et al. |
| 5,244,474 A | 9/1993 | Lorcks et al. |
| 5,278,222 A | 1/1994 | Stack |
| 5,300,144 A | 4/1994 | Adams |
| 5,300,192 A | 4/1994 | Hansen et al. |
| 5,308,896 A | 5/1994 | Hansen et al. |
| 5,318,990 A | 6/1994 | Strauss |
| 5,336,753 A | 8/1994 | Jung et al. |
| 5,336,755 A | 8/1994 | Pape |
| 5,336,766 A | 8/1994 | Koga et al. |
| 5,340,868 A | 8/1994 | Strauss et al. |
| 5,346,541 A * | 9/1994 | Goldman ................ C08L 1/00 536/84 |
| 5,352,480 A | 10/1994 | Hansen et al. |
| 5,367,849 A | 11/1994 | Bullock |
| 5,371,194 A | 12/1994 | Ferretti |
| 5,387,665 A | 2/1995 | Misawa et al. |
| 5,389,716 A | 2/1995 | Graves |
| 5,393,849 A | 2/1995 | Srinivasan et al. |
| 5,416,139 A | 5/1995 | Zeiszler |
| 5,421,838 A | 6/1995 | Gosset et al. |
| 5,424,418 A | 6/1995 | Duflot |
| 5,434,233 A | 7/1995 | Kiely et al. |
| 5,447,977 A | 9/1995 | Hansen et al. |
| 5,470,843 A | 11/1995 | Stahl et al. |
| 5,480,973 A | 1/1996 | Goodlad et al. |
| 5,492,756 A | 2/1996 | Seale et al. |
| 5,498,662 A | 3/1996 | Tanaka et al. |
| 5,503,920 A | 4/1996 | Alkire et al. |
| 5,534,612 A | 7/1996 | Taylor et al. |
| 5,536,766 A | 7/1996 | Seyffer et al. |
| 5,538,783 A | 7/1996 | Hansen et al. |
| 5,543,215 A | 8/1996 | Hansen et al. |
| 5,545,279 A | 8/1996 | Hall et al. |
| 5,547,541 A | 8/1996 | Hansen et al. |
| 5,547,745 A | 8/1996 | Hansen et al. |
| 5,550,189 A | 8/1996 | Qin et al. |
| 5,554,730 A | 9/1996 | Woiszwillo et al. |
| 5,562,740 A | 10/1996 | Cook et al. |
| 5,571,618 A | 11/1996 | Hansen et al. |
| 5,578,678 A | 11/1996 | Hartmann et al. |
| 5,580,856 A | 12/1996 | Prestrelski et al. |
| 5,582,682 A | 12/1996 | Ferretti |
| 5,583,193 A | 12/1996 | Aravindakshan et al. |
| 5,589,256 A | 12/1996 | Hansen et al. |
| 5,589,536 A | 12/1996 | Golino et al. |
| 5,607,759 A | 3/1997 | Hansen et al. |
| 5,608,011 A | 3/1997 | Eck et al. |
| 5,609,727 A | 3/1997 | Hansen et al. |
| 5,614,570 A | 3/1997 | Hansen et al. |
| 5,620,940 A | 4/1997 | Birbara et al. |
| 5,621,026 A | 4/1997 | Tanaka et al. |
| 5,633,298 A | 5/1997 | Arfaei et al. |
| 5,641,561 A | 6/1997 | Hansen et al. |
| 5,643,978 A | 7/1997 | Darwin et al. |
| 5,645,756 A | 7/1997 | Dubin et al. |
| 5,660,904 A | 8/1997 | Andersen et al. |

(56) References Cited

U.S. PATENT DOCUMENTS

| | | |
|---|---|---|
| 5,661,213 A | 8/1997 | Arkens et al. |
| 5,670,585 A | 9/1997 | Taylor et al. |
| 5,672,418 A | 9/1997 | Hansen et al. |
| 5,672,659 A | 9/1997 | Shalaby et al. |
| 5,690,715 A | 11/1997 | Schiwek |
| 5,691,060 A | 11/1997 | Levy |
| 5,693,411 A | 12/1997 | Hansen et al. |
| 5,719,092 A | 2/1998 | Arrington |
| 5,719,228 A | 2/1998 | Taylor et al. |
| 5,733,624 A | 3/1998 | Syme et al. |
| 5,756,580 A | 5/1998 | Natori et al. |
| 5,763,524 A | 6/1998 | Arkens et al. |
| 5,788,243 A | 8/1998 | Harshaw et al. |
| 5,788,423 A | 8/1998 | Perkins |
| 5,807,364 A | 9/1998 | Hansen |
| 5,855,987 A | 1/1999 | Margel et al. |
| 5,863,985 A | 1/1999 | Shalaby et al. |
| 5,885,337 A | 3/1999 | Nohr et al. |
| 5,895,804 A | 4/1999 | Lee et al. |
| 5,905,115 A | 5/1999 | Luitjes et al. |
| 5,916,503 A | 6/1999 | Rettenbacher |
| 5,919,528 A | 7/1999 | Huijs et al. |
| 5,919,831 A | 7/1999 | Philipp |
| 5,922,403 A | 7/1999 | Tecle |
| 5,925,722 A | 7/1999 | Exner et al. |
| 5,929,184 A | 7/1999 | Holmes-Farley et al. |
| 5,929,196 A | 7/1999 | Kissel et al. |
| 5,932,344 A | 8/1999 | Ikemoto et al. |
| 5,932,665 A | 8/1999 | DePorter et al. |
| 5,932,689 A | 8/1999 | Arkens et al. |
| 5,942,123 A | 8/1999 | McArdle |
| 5,954,869 A | 9/1999 | Elfersy et al. |
| 5,977,224 A | 11/1999 | Cheung et al. |
| 5,977,232 A | 11/1999 | Arkens et al. |
| 5,981,719 A | 11/1999 | Woiszwillo et al. |
| 5,983,586 A | 11/1999 | Berdan, II et al. |
| 5,990,216 A | 11/1999 | Cai et al. |
| 5,993,709 A | 11/1999 | Bonomo et al. |
| 6,022,615 A | 2/2000 | Rettenbacher |
| 6,067,821 A | 5/2000 | Jackson et al. |
| 6,071,549 A | 6/2000 | Hansen |
| 6,071,994 A | 6/2000 | Hummerich et al. |
| 6,072,086 A | 6/2000 | James et al. |
| 6,077,883 A | 6/2000 | Taylor et al. |
| 6,090,925 A | 7/2000 | Woiszwillo et al. |
| 6,114,033 A | 9/2000 | Ikemoto et al. |
| 6,114,464 A | 9/2000 | Reck et al. |
| 6,133,347 A | 10/2000 | Vickers, Jr. et al. |
| 6,136,916 A | 10/2000 | Arkens et al. |
| 6,139,619 A | 10/2000 | Zaretskiy et al. |
| 6,143,243 A | 11/2000 | Gershun et al. |
| 6,171,444 B1 | 1/2001 | Nigam |
| 6,171,654 B1 | 1/2001 | Salsman et al. |
| 6,180,037 B1 | 1/2001 | Anderson et al. |
| 6,194,512 B1 | 2/2001 | Chen et al. |
| 6,210,472 B1 | 4/2001 | Kwan et al. |
| 6,221,958 B1 | 4/2001 | Shalaby et al. |
| 6,221,973 B1 | 4/2001 | Arkens et al. |
| 6,231,721 B1 | 5/2001 | Quick et al. |
| 6,274,661 B1 | 8/2001 | Chen et al. |
| 6,281,298 B1 | 8/2001 | Papsin, Jr. |
| 6,299,677 B1 | 10/2001 | Johnson et al. |
| 6,299,936 B1 | 10/2001 | Reck et al. |
| 6,307,732 B1 | 10/2001 | Tsubaki et al. |
| 6,310,227 B1 | 10/2001 | Sarama et al. |
| 6,313,102 B1 | 11/2001 | Colaco et al. |
| 6,319,683 B1 | 11/2001 | James et al. |
| 6,331,350 B1 | 12/2001 | Taylor et al. |
| 6,331,513 B1 | 12/2001 | Zaid et al. |
| 6,340,411 B1 | 1/2002 | Hansen et al. |
| 6,348,530 B1 | 2/2002 | Reck et al. |
| 6,365,079 B1 | 4/2002 | Winkler et al. |
| 6,372,077 B1 | 4/2002 | Tecle |
| 6,379,739 B1 | 4/2002 | Formanek et al. |
| 6,379,814 B1 | 4/2002 | Dupre et al. |
| 6,395,856 B1 | 5/2002 | Petty et al. |
| 6,403,665 B1 | 6/2002 | Sieker et al. |
| 6,407,225 B1 | 6/2002 | Mang et al. |
| 6,410,036 B1 | 6/2002 | De Rosa et al. |
| 6,440,204 B1 | 8/2002 | Rogols et al. |
| 6,441,122 B1 | 8/2002 | DeMott et al. |
| 6,461,553 B1 | 10/2002 | Hansen et al. |
| 6,468,442 B2 | 10/2002 | Bytnar |
| 6,468,730 B2 | 10/2002 | Fujiwara et al. |
| 6,469,120 B1 | 10/2002 | Elfersy et al. |
| 6,475,552 B1 | 11/2002 | Shah et al. |
| 6,482,875 B2 | 11/2002 | Lorenz et al. |
| 6,482,876 B1 | 11/2002 | Witt-Nuesslein et al. |
| 6,495,656 B1 | 12/2002 | Haile et al. |
| 6,521,339 B1 | 2/2003 | Hansen et al. |
| 6,525,009 B2 | 2/2003 | Sachdev et al. |
| 6,538,057 B1 | 3/2003 | Wildburg et al. |
| 6,547,867 B2 | 4/2003 | Rogols et al. |
| 6,555,616 B1 | 4/2003 | Helbing et al. |
| 6,559,302 B1 | 5/2003 | Shah et al. |
| 6,562,267 B1 | 5/2003 | Hansen et al. |
| 6,596,103 B1 | 7/2003 | Hansen et al. |
| 6,613,378 B1 | 9/2003 | Erhan et al. |
| 6,638,882 B1 | 10/2003 | Helbing et al. |
| 6,638,884 B2 | 10/2003 | Quick et al. |
| 6,699,945 B1 | 3/2004 | Chen et al. |
| 6,706,853 B1 | 3/2004 | Stanssens et al. |
| 6,719,862 B2 | 4/2004 | Quick et al. |
| 6,730,730 B1 | 5/2004 | Hansen et al. |
| 6,753,361 B2 | 6/2004 | Kroner et al. |
| 6,818,694 B2 | 11/2004 | Hindi et al. |
| 6,821,547 B2 | 11/2004 | Shah et al. |
| 6,852,247 B2 | 2/2005 | Bytnar |
| 6,858,074 B2 | 2/2005 | Anderson et al. |
| 6,861,495 B2 | 3/2005 | Barsotti et al. |
| 6,864,044 B2 | 3/2005 | Ishikawa et al. |
| 6,878,800 B2 | 4/2005 | Husemoen et al. |
| 6,884,849 B2 | 4/2005 | Chen et al. |
| 6,955,844 B2 | 10/2005 | Tagge et al. |
| 6,962,714 B2 | 11/2005 | Hei et al. |
| 6,989,171 B2 | 1/2006 | Portman |
| 6,992,203 B2 | 1/2006 | Trusovs |
| 7,018,490 B2 | 3/2006 | Hansen et al. |
| 7,026,390 B2 * | 4/2006 | O'Brien-Bernini .... D04H 1/587 524/502 |
| 7,029,717 B1 | 4/2006 | Ojima et al. |
| 7,067,579 B2 | 6/2006 | Taylor et al. |
| 7,083,831 B1 | 8/2006 | Koch et al. |
| 7,090,745 B2 | 8/2006 | Beckman et al. |
| 7,141,626 B2 | 11/2006 | Rodrigues et al. |
| 7,144,474 B1 | 12/2006 | Hansen et al. |
| 7,195,792 B2 | 3/2007 | Boston et al. |
| 7,201,778 B2 | 4/2007 | Smith et al. |
| 7,201,825 B2 | 4/2007 | Dezutter et al. |
| 7,202,326 B2 | 4/2007 | Kuroda et al. |
| 7,241,487 B2 | 7/2007 | Taylor et al. |
| 7,458,235 B2 | 12/2008 | Beaufils et al. |
| 7,514,027 B2 | 4/2009 | Horres et al. |
| 7,655,711 B2 | 2/2010 | Swift et al. |
| 7,772,347 B2 | 8/2010 | Swift et al. |
| 7,795,354 B2 | 9/2010 | Srinivasan et al. |
| 7,803,879 B2 | 9/2010 | Srinivasan et al. |
| 7,807,771 B2 | 10/2010 | Swift et al. |
| 7,842,382 B2 | 11/2010 | Helbing |
| 7,854,980 B2 | 12/2010 | Jackson et al. |
| 7,883,693 B2 | 2/2011 | Sehl et al. |
| 7,888,445 B2 | 2/2011 | Swift et al. |
| 7,947,765 B2 | 5/2011 | Swift et al. |
| 8,114,210 B2 | 2/2012 | Hampson et al. |
| 8,182,648 B2 | 5/2012 | Swift et al. |
| 8,211,923 B2 | 7/2012 | Wagner et al. |
| 8,232,334 B2 * | 7/2012 | Kelly ...................... C08L 5/00 524/14 |
| 8,372,900 B2 | 2/2013 | Shooshtari et al. |
| 8,377,564 B2 | 2/2013 | Shooshtari et al. |
| 8,501,838 B2 | 8/2013 | Jackson et al. |
| 8,680,224 B2 | 3/2014 | Zhang et al. |
| 8,691,934 B2 | 4/2014 | Helbing et al. |
| 8,900,495 B2 | 12/2014 | Pacorel et al. |

(56) References Cited

U.S. PATENT DOCUMENTS

| | | |
|---|---|---|
| 9,394,431 B2 | 7/2016 | Alavi |
| 10,208,414 B2 | 2/2019 | Lester et al. |
| 2001/0017427 A1 | 8/2001 | Rosthauser et al. |
| 2001/0046824 A1 | 11/2001 | Nigam |
| 2002/0000100 A1 | 1/2002 | Burg et al. |
| 2002/0025435 A1 | 2/2002 | Hansen et al. |
| 2002/0026025 A1 | 2/2002 | Kuo et al. |
| 2002/0028857 A1 | 3/2002 | Holy |
| 2002/0032253 A1 | 3/2002 | Lorenz et al. |
| 2002/0042473 A1 | 4/2002 | Trollsas et al. |
| 2002/0091185 A1 | 7/2002 | Taylor et al. |
| 2002/0096278 A1 | 7/2002 | Foster et al. |
| 2002/0123598 A1 | 9/2002 | Sieker et al. |
| 2002/0130439 A1 | 9/2002 | Kroner et al. |
| 2002/0161108 A1 | 10/2002 | Schultz et al. |
| 2002/0197352 A1 | 12/2002 | Portman |
| 2003/0005857 A1 | 1/2003 | Minami et al. |
| 2003/0040239 A1 | 2/2003 | Toas et al. |
| 2003/0044513 A1 | 3/2003 | Shah et al. |
| 2003/0066523 A1 | 4/2003 | Lewis et al. |
| 2003/0071879 A1 | 4/2003 | Swenson |
| 2003/0116294 A1 | 6/2003 | Kehrer et al. |
| 2003/0134945 A1 | 7/2003 | Capps |
| 2003/0148084 A1 | 8/2003 | Trocino |
| 2003/0153690 A1 | 8/2003 | Husemoen et al. |
| 2003/0185991 A1 | 10/2003 | Wigger et al. |
| 2003/0203117 A1 | 10/2003 | Bartkowiak et al. |
| 2004/0002567 A1 | 1/2004 | Chen et al. |
| 2004/0019168 A1 | 1/2004 | Soerens et al. |
| 2004/0024170 A1 | 2/2004 | Husemoen et al. |
| 2004/0033269 A1 | 2/2004 | Hei et al. |
| 2004/0033747 A1 | 2/2004 | Miller et al. |
| 2004/0034154 A1 | 2/2004 | Tutin et al. |
| 2004/0038017 A1 | 2/2004 | Tutin et al. |
| 2004/0048531 A1 | 3/2004 | Belmares et al. |
| 2004/0077055 A1 | 4/2004 | Fosdick et al. |
| 2004/0079499 A1 | 4/2004 | Dezutter et al. |
| 2004/0087024 A1 | 5/2004 | Bellocq et al. |
| 2004/0087719 A1 | 5/2004 | Rautschek et al. |
| 2004/0122166 A1 | 6/2004 | O'Brien-Bernini et al. |
| 2004/0131874 A1 | 7/2004 | Tutin et al. |
| 2004/0144706 A1 | 7/2004 | Beaufils et al. |
| 2004/0152824 A1 | 8/2004 | Dobrowolski |
| 2004/0161993 A1 | 8/2004 | Tripp et al. |
| 2004/0209851 A1 | 10/2004 | Nelson et al. |
| 2004/0213930 A1 | 10/2004 | Halabisky |
| 2004/0220368 A1 | 11/2004 | Li et al. |
| 2004/0249066 A1 | 12/2004 | Heinzman et al. |
| 2004/0254285 A1 | 12/2004 | Rodrigues et al. |
| 2004/0260082 A1 | 12/2004 | Van Der Wilden et al. |
| 2005/0001198 A1 | 1/2005 | Bytnar |
| 2005/0017394 A1 | 1/2005 | Hochsmann et al. |
| 2005/0027283 A1 | 2/2005 | Richard et al. |
| 2005/0033037 A1 | 2/2005 | Trusovs |
| 2005/0048212 A1 | 3/2005 | Clamen et al. |
| 2005/0059770 A1 | 3/2005 | Srinivasan et al. |
| 2005/0171085 A1 | 8/2005 | Pinto et al. |
| 2005/0196421 A1 | 9/2005 | Hunter et al. |
| 2005/0202224 A1 | 9/2005 | Helbing |
| 2005/0208852 A1 | 9/2005 | Weber |
| 2005/0215153 A1 | 9/2005 | Cossement et al. |
| 2005/0245669 A1 | 11/2005 | Clungeon et al. |
| 2005/0275133 A1 | 12/2005 | Cabell et al. |
| 2005/0288479 A1 | 12/2005 | Kuroda et al. |
| 2006/0005580 A1 | 1/2006 | Espiard et al. |
| 2006/0009569 A1 | 1/2006 | Charbonneau et al. |
| 2006/0044302 A1 | 3/2006 | Chen |
| 2006/0099870 A1 | 5/2006 | Garcia et al. |
| 2006/0111480 A1 | 5/2006 | Hansen et al. |
| 2006/0124538 A1 | 6/2006 | Morcrette et al. |
| 2006/0135433 A1 | 6/2006 | Murray et al. |
| 2006/0141177 A1 | 6/2006 | Ligtenberg et al. |
| 2006/0179892 A1 | 8/2006 | Horres et al. |
| 2006/0188465 A1 | 8/2006 | Perrier et al. |
| 2006/0198954 A1 | 9/2006 | Frechem et al. |
| 2006/0231487 A1 | 10/2006 | Bartley et al. |
| 2006/0252855 A1 | 11/2006 | Pisanova et al. |
| 2006/0281622 A1 | 12/2006 | Maricourt et al. |
| 2007/0006390 A1 | 1/2007 | Clamen et al. |
| 2007/0009582 A1 | 1/2007 | Madsen et al. |
| 2007/0027281 A1 | 2/2007 | Michl et al. |
| 2007/0039520 A1 | 2/2007 | Crews et al. |
| 2007/0082983 A1 | 4/2007 | Crews et al. |
| 2007/0123679 A1 | 5/2007 | Swift et al. |
| 2007/0123680 A1 | 5/2007 | Swift et al. |
| 2007/0129522 A1 | 6/2007 | Burckhardt et al. |
| 2007/0142596 A1 | 6/2007 | Swift et al. |
| 2007/0158022 A1 | 7/2007 | Heep et al. |
| 2007/0184740 A1 | 8/2007 | Keller et al. |
| 2007/0191574 A1 | 8/2007 | Miller et al. |
| 2007/0270070 A1 | 11/2007 | Othman |
| 2007/0287018 A1 | 12/2007 | Tutin et al. |
| 2007/0292618 A1 | 12/2007 | Srinivasan et al. |
| 2007/0292619 A1 | 12/2007 | Srinivasan et al. |
| 2007/0298274 A1 | 12/2007 | Eriksson et al. |
| 2008/0009209 A1 | 1/2008 | Clamen et al. |
| 2008/0009616 A1 | 1/2008 | Frank et al. |
| 2008/0051539 A1 | 2/2008 | Kelly |
| 2008/0060551 A1 | 3/2008 | Crews et al. |
| 2008/0081138 A1 | 4/2008 | Moore et al. |
| 2008/0108741 A1 | 5/2008 | Van Herwijnen et al. |
| 2008/0160260 A1 | 7/2008 | Wada et al. |
| 2008/0160302 A1 | 7/2008 | Asrar et al. |
| 2008/0194738 A1 | 8/2008 | Crews et al. |
| 2009/0169867 A1 | 7/2009 | Kelly |
| 2009/0170978 A1 | 7/2009 | Kelly |
| 2009/0227732 A1 | 9/2009 | Glockner et al. |
| 2009/0275699 A1 | 11/2009 | Zhang et al. |
| 2009/0301972 A1 | 12/2009 | Hines et al. |
| 2009/0304919 A1 | 12/2009 | Huenig et al. |
| 2009/0306255 A1 | 12/2009 | Patel et al. |
| 2009/0324915 A1 | 12/2009 | Swift et al. |
| 2010/0029160 A1 | 2/2010 | Srinivasan et al. |
| 2010/0058661 A1 | 3/2010 | Jackson et al. |
| 2010/0080976 A1 | 4/2010 | Jackson et al. |
| 2010/0084598 A1 | 4/2010 | Jackson et al. |
| 2010/0086726 A1 | 4/2010 | Jackson et al. |
| 2010/0087571 A1 | 4/2010 | Jackson et al. |
| 2010/0098947 A1 | 4/2010 | Inoue et al. |
| 2010/0117023 A1 | 5/2010 | Dopico et al. |
| 2010/0129593 A1 | 5/2010 | Rempt et al. |
| 2010/0129640 A1 | 5/2010 | Kelly |
| 2010/0130649 A1 | 5/2010 | Swift et al. |
| 2010/0175826 A1 | 7/2010 | Huenig et al. |
| 2010/0210595 A1 | 8/2010 | Wagner et al. |
| 2010/0222463 A1 | 9/2010 | Brady et al. |
| 2010/0222566 A1 | 9/2010 | Fosdick et al. |
| 2010/0282996 A1 | 11/2010 | Jaffrennou et al. |
| 2010/0301256 A1 | 12/2010 | Hampson et al. |
| 2010/0320113 A1 | 12/2010 | Swift |
| 2011/0021672 A1 | 1/2011 | Crews et al. |
| 2011/0039111 A1 | 2/2011 | Shooshtari |
| 2011/0040010 A1 | 2/2011 | Shooshtari |
| 2011/0042303 A1 | 2/2011 | Shooshtari et al. |
| 2011/0045966 A1 | 2/2011 | Shooshtari et al. |
| 2011/0089074 A1 | 4/2011 | Jackson et al. |
| 2011/0135937 A1 | 6/2011 | Swift et al. |
| 2011/0190425 A1 | 8/2011 | Swift |
| 2011/0220835 A1 | 9/2011 | Swift et al. |
| 2011/0223364 A1* | 9/2011 | Hawkins ............... C09D 133/02 |
| | | 428/292.1 |
| 2011/0256790 A1 | 10/2011 | Toas et al. |
| 2011/0260094 A1 | 10/2011 | Hampson et al. |
| 2011/0262648 A1 | 10/2011 | Lee et al. |
| 2011/0263757 A1 | 10/2011 | Rand et al. |
| 2011/0306726 A1 | 12/2011 | Bailey et al. |
| 2012/0133073 A1 | 5/2012 | Pacorel et al. |
| 2012/0135152 A1* | 5/2012 | Finch .................... C08L 79/02 |
| | | 427/389.9 |
| 2012/0156954 A1 | 6/2012 | Eckert et al. |
| 2013/0029150 A1 | 1/2013 | Appley et al. |
| 2013/0032749 A1 | 2/2013 | Jaffrennou et al. |
| 2013/0047888 A1 | 2/2013 | Mueller et al. |
| 2013/0059075 A1 | 3/2013 | Appley et al. |

(56) References Cited

U.S. PATENT DOCUMENTS

| | | | |
|---|---|---|---|
| 2013/0082205 A1 | 4/2013 | Mueller et al. | |
| 2013/0174758 A1 | 7/2013 | Mueller | |
| 2013/0234362 A1 | 9/2013 | Swift et al. | |
| 2013/0236650 A1 | 9/2013 | Swift et al. | |
| 2013/0237113 A1 | 9/2013 | Swift et al. | |
| 2013/0244524 A1 | 9/2013 | Swift et al. | |
| 2013/0323492 A1 | 12/2013 | Finch et al. | |
| 2014/0083328 A1* | 3/2014 | Lochel, Jr. | C09J 191/00 106/217.7 |
| 2014/0091247 A1 | 4/2014 | Jackson et al. | |
| 2014/0134909 A1 | 5/2014 | Guo et al. | |
| 2014/0357787 A1 | 12/2014 | Jobber et al. | |

FOREIGN PATENT DOCUMENTS

| | | |
|---|---|---|
| CA | 1090026 | 11/1980 |
| CA | 2037214 | 9/1991 |
| CA | 2232334 | 11/1998 |
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004033561 | 9/2005 |
| DE | 102005023431 | 11/2006 |
| EP | 0044614 A2 | 1/1982 |
| EP | 0099801 | 2/1984 |
| EP | 354023 | 2/1990 |
| EP | 0375235 A1 | 6/1990 |
| EP | 0461995 | 12/1991 |
| EP | 0524518 A2 | 1/1993 |
| EP | 0547819 A2 | 6/1993 |
| EP | 0583086 A1 | 2/1994 |
| EP | 0714754 A2 | 6/1996 |
| EP | 796681 | 9/1997 |
| EP | 0826710 A2 | 3/1998 |
| EP | 856494 | 8/1998 |
| EP | 0873976 A1 | 10/1998 |
| EP | 878135 | 11/1998 |
| EP | 0882756 A2 | 12/1998 |
| EP | 0911361 A1 | 4/1999 |
| EP | 915811 | 5/1999 |
| EP | 936060 | 8/1999 |
| EP | 976866 | 2/2000 |
| EP | 0990729 A1 | 4/2000 |
| EP | 1038433 A1 | 9/2000 |
| EP | 1193288 A1 | 4/2002 |
| EP | 1084167 | 9/2002 |
| EP | 1268702 | 1/2003 |
| EP | 1382642 | 1/2004 |
| EP | 1486547 A2 | 12/2004 |
| EP | 1522642 | 4/2005 |
| EP | 1698598 A1 | 9/2006 |
| EP | 1767566 | 4/2007 |
| EP | 2223941 | 9/2010 |
| EP | 2253663 | 11/2010 |
| EP | 2669349 A1 | 12/2013 |
| EP | 2679624 A1 | 1/2014 |
| EP | 2692810 A1 | 2/2014 |
| EP | 3221412 A1 | 9/2017 |
| FR | 2614388 | 10/1988 |
| GB | 770561 | 3/1957 |
| GB | 809675 | 3/1959 |
| GB | 926749 | 5/1963 |
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2078805 A | 1/1982 |
| GB | 2173523 | 10/1986 |
| GB | 2251438 | 7/1992 |
| JP | 53113784 | 10/1978 |
| JP | 57101100 | 6/1982 |
| JP | 58011193 | 1/1983 |
| JP | 61195647 | 8/1986 |
| JP | 3-173680 | 7/1991 |
| JP | 05186635 | 7/1993 |
| JP | 7-034023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002293576 | 10/2002 |
| JP | 2003147276 | 5/2003 |
| JP | 2003238921 | 8/2003 |
| JP | 2004060058 | 2/2004 |
| JP | 2005306919 | 11/2005 |
| NZ | 549563 | 1/2008 |
| RU | 1765996 | 8/1995 |
| SU | 374400 | 3/1973 |
| WO | 1990007541 | 7/1990 |
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 200206178 | 1/2002 |
| WO | 2003029496 | 4/2003 |
| WO | 2003071879 | 9/2003 |
| WO | 2003106561 | 12/2003 |
| WO | 2004007615 | 1/2004 |
| WO | 2004061038 A1 | 7/2004 |
| WO | 2004076734 | 9/2004 |
| WO | 2005061647 A1 | 7/2005 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007112335 | 10/2007 |
| WO | 2008089851 | 7/2008 |
| WO | WO-2008089847 A1 * | 7/2008 ............ B27N 3/002 |
| WO | 2008141201 | 11/2008 |
| WO | 2009019235 | 2/2009 |
| WO | 2009079254 A1 | 6/2009 |
| WO | 2009129084 | 10/2009 |
| WO | 2010027937 | 3/2010 |
| WO | 2010106181 A1 | 9/2010 |
| WO | 2010139899 | 12/2010 |
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011042610 A1 | 4/2011 |
| WO | 2011044490 A1 | 4/2011 |
| WO | 2011138459 | 11/2011 |
| WO | 2011150203 A2 | 12/2011 |
| WO | 2012172265 A1 | 12/2012 |
| WO | 2013021112 A1 | 2/2013 |
| WO | 2013036752 A2 | 3/2013 |
| WO | 2013150123 | 10/2013 |
| WO | 2014001518 A1 | 1/2014 |

OTHER PUBLICATIONS

Office action for co-pending U.S. Appl. No. 15/326,532 (8 pages)—Dec. 17, 2019.

(56) References Cited

OTHER PUBLICATIONS

International Search Report and Written Opinion for PCT/EP2015/066455, completed Oct. 26, 2015.
Office action for co-pending U.S. Appl. No. 12/667,718 (5 pages)—Sep. 3, 2013.
Office action for co-pending U.S. Appl. No. 12/667,718 (6 pages)—Sep. 9, 2014.
Office action for co-pending U.S. Appl. No. 12/671,922 (10 pages)—Oct. 7, 2011.
Office action for co-pending U.S. Appl. No. 12/671,922 (10 pages)—May 10, 2012.
Office action for co-pending U.S. Appl. No. 12/671,922 (9 pages)—Sep. 23, 2014.
Office action for co-pending U.S. Appl. No. 12/671,922 (5 pages)—Apr. 4, 2016.
Office action for co-pending U.S. Appl. No. 13/388,408 (5 pages)—Aug. 15, 2013.
Office action for co-pending U.S. Appl. No. 13/371,829 (9 pages)—Dec. 20, 2012.
Office action for co-pending U.S. Appl. No. 13/371,829 (6 pages)—Jul. 12, 2013.
Office action for co-pending U.S. Appl. No. 13/371,829 (6 pages)—Aug. 12, 2014.
Office action for co-pending U.S. Appl. No. 13/637,794 (8 pages)—Aug. 12, 2013.
Office action for co-pending U.S. Appl. No. 13/637,794 (9 pages)—Mar. 26, 2014.
Office action for co-pending U.S. Appl. No. 13/696,439 (11 pages)—Jan. 8, 2014.
Office action for co-pending U.S. Appl. No. 13/696,452 (7 pages)—Jan. 13, 2015.
Office action for co-pending U.S. Appl. No. 13/696,452 (9 pages)—Oct. 27, 2015.
Office action for co-pending U.S. Appl. No. 13/702,144 (6 pages)—Jan. 10, 2014.
Office action for co-pending U.S. Appl. No. 13/702,144 (7 pages)—Jul. 29, 2014.
Office action for co-pending U.S. Appl. No. 13/823,818 (9 pages)—Mar. 26, 2015.
Office action for co-pending U.S. Appl. No. 13/866,368 (16 pages)—Aug. 29, 2013.
Office action for co-pending U.S. Appl. No. 13/866,368 (11 pages)—Apr. 16, 2014.
Office action for co-pending U.S. Appl. No. 13/866,368 (8 pages)—Aug. 21, 2014.
Office action for co-pending U.S. Appl. No. 13/866,419 (14 pages)—Sep. 20, 2013.
Office action for co-pending U.S. Appl. No. 13/866,419 (10 pages)—Apr. 25, 2014.
Office action for co-pending U.S. Appl. No. 13/866,419 (8 pages)—Oct. 9, 2014.
Office action for co-pending U.S. Appl. No. 13/866,419 (8 pages)—Sep. 25, 2015.
Office action for co-pending U.S. Appl. No. 13/868,233 (23 pages)—Aug. 13, 2013.
Office action for co-pending U.S. Appl. No. 13/868,233 (12 pages)—Apr. 15, 2014.
Office action for co-pending U.S. Appl. No. 13/868,233 (8 pages)—Oct. 7, 2014.
Office action for co-pending U.S. Appl. No. 13/868,233 (8 pages)—Jul. 16, 2015.
Office action for co-pending U.S. Appl. No. 13/868,238 (8 pages)—Jul. 16, 2014.
Office action for co-pending U.S. Appl. No. 12/976,379 (7 pages)—Jan. 10, 2012.
Office action for co-pending U.S. Appl. No. 12/976,379 (6 pages)—Jul. 27, 2012.
Office action for co-pending U.S. Appl. No. 12/976,379 (9 pages)—Mar. 7, 2013.
Office action for co-pending U.S. Appl. No. 12/976,379 (8 pages)—Aug. 20, 2013.
Office action for co-pending U.S. Appl. No. 12/599,858 (8 pages)—May 11, 2011.
Office action for co-pending U.S. Appl. No. 13/341,542 (8 pages)—Dec. 26, 2012.
Office action for co-pending U.S. Appl. No. 13/341,542 (7 pages)—Feb. 10, 2014.
Office action for co-pending U.S. Appl. No. 14/026,394 (6 pages)—Aug. 14, 2014.
Office action for co-pending U.S. Appl. No. 14/272,556 (14 pages)—Nov. 20, 2014.
Office action for co-pending U.S. Appl. No. 14/272,556 (12 pages)—Sep. 17, 2015.
Office action for co-pending U.S. Appl. No. 14/342,069 (17 pages)—Dec. 29, 2015.
Office action for co-pending U.S. Appl. No. 14/342,069 (22 pages)—Sep. 2, 2016.
Office action for co-pending U.S. Appl. No. 14/342,069 (21 pages)—Sep. 26, 2017.
Office action for co-pending U.S. Appl. No. 14/342,069 (21 pages)—Jun. 6, 2018.
Office action for co-pending U.S. Appl. No. 14/390,445 (14 pages)—Dec. 3, 2015.
Office action for co-pending U.S. Appl. No. 14/649,277 (9 pages)—Jul. 22, 2016.
Office action for co-pending U.S. Appl. No. 14/686,915 (8 pages)—Nov. 18, 2016.
Office action for co-pending U.S. Appl. No. 14/810,765 (7 pages)—Jan. 29, 2016.
Office action for co-pending U.S. Appl. No. 14/828,916 (8 pages)—Nov. 25, 2016.
Office action for co-pending U.S. Appl. No. 14/867,502 (9 pages)—Nov. 18, 2016.
International Search Report and Written Opinion for PCT/US2008/059730, completed Sep. 22, 2008.
International Search Report and Written Opinion for PCT/US2008/069046, completed Sep. 25, 2008.
International Search Report and Written Opinion for PCT/EP2011/059317, completed Jul. 15, 2011.
International Search Report for PCT/EP2008/060185, completed Oct. 23, 2008.
International Search Report for PCT/EP2011/057363, completed Sep. 5, 2011.
Ames, J.M., "The Maillard Browning Reaction—an Update," Chemistry & Industry, No. 17, 1988, 4 pages.
"Gamma-aminopropyltrimethoxysilane," Hawley's Condensed Chemical Dictionary, 14th Edition, John Wiley & Sons, Inc., 2002, 1 page.
Hodge, J.E., Chemistry of Browning Reactions in Model Systems, 1953, J. Agric. Food Chem., vol. 1, No. 15, pp. 928-943.
Agyei-Aye et al., "The Role of Anion in the Reaction of Reducing Sugars with Ammonium Salts," Carbohydrate Research 2002, 337: 2273-2277.
Laroque et al., "Kinetic study on the Maillard reaction. Consideration of sugar reactivity," Food Chemistry 2008, 111: 1032-1042.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 2012, 22 pages.
Decision re Opposition to AU 2006272595, issued from Australian Patent Office, Aug. 14, 2015, 25 pages.
Opposition to EP 1732968, Notice of Opposition: Prior Art, Scope of the Patent, Reasons for the Opposition, issued from European Patent Office, Mar. 8, 2012, 18 pages.
Decision re Opposition to EP 1732968, issued from the European Patent Office, Nov. 14, 2014, 5 pages.

(56) References Cited

OTHER PUBLICATIONS

Opposition to EA 019802, submitted to Eurasian Patent Office on Dec. 26, 2014, 36 pages.
Decision re Opposition to EA 019802, issued by Eurasian Patent Office on Aug. 18, 2015, 15 pages.
Owens Corning Retiree Update: What Goes Around, Comes Around: A tale of Natural Binders, revised Mar. 20, 2013, p. 4.
A.P. Bryant, "The Terminology of Sugars," Industrial and Engineering Chemistry, vol. 26, No. 2, p. 231, Feb. 1934.
Food Flavor Chemistry, p. 162, Mar. 21, 2009 (English Abstract).
Mswanathan, T., "Chapter 28: Thermosetting Adhesive Resins from Whey and Whey Byproducts," in Adhesives from Renewable Resources, ACS Symposium Series, Hemingway, R.W., et al. (Eds.), American Chemical Society, Washington, DC (1989).
Mswanathan, T., and Richardson, T., "Thermosetting Adhesive Resins from Whey and Whey Byproducts," Ind. Eng. Chem. Prod. Res. Dev. 23:644-47, American Chemical Society, United States (1984).
Residential Energy Conservation: vol. 1, Congress of the U.S., Office of Technology Assessment (Ed.), 357 pages (Jan. 1, 1979).
Office action for co-pending U.S. Appl. No. 12/524,502 (9 pages)—Sep. 21, 2012.
Office action for co-pending U.S. Appl. No. 12/524,502 (9 pages)—Apr. 4, 2013.
Office action for co-pending U.S. Appl. No. 12/524,512 (7 pages)—Aug. 6, 2012.
Office action for co-pending U.S. Appl. No. 12/524,512 (9 pages)—Apr. 1, 2013.
Office action for co-pending U.S. Appl. No. 12/524,512 (14 pages)—Nov. 12, 2014.
Office action for co-pending U.S. Appl. No. 12/524,512 (9 pages)—Jul. 10, 2015.
Office action for co-pending U.S. Appl. No. 12/524,512 (10 pages)—Mar. 23, 2016.
Office action for co-pending U.S. Appl. No. 12/524,512 (13 pages)—Oct. 5, 2016.
Office action for co-pending U.S. Appl. No. 12/524,512 (13 pages)—Apr. 6, 2018.
Office action for co-pending U.S. Appl. No. 12/524,512 (15 pages)—Jan. 17, 2019.
Office action for co-pending U.S. Appl. No. 12/524,469 (7 pages)—Jun. 7, 2012.
Office action for co-pending U.S. Appl. No. 12/524,469 (8 pages)—Jan. 29, 2013.
Office action for co-pending U.S. Appl. No. 12/524,469 (7 pages)—Aug. 20, 2013.
Office action for co-pending U.S. Appl. No. 12/524,469 (9 pages)—Jun. 9, 2014.
Office action for co-pending U.S. Appl. No. 12/524,469 (9 pages)—Oct. 17, 2014.
Office action for co-pending U.S. Appl. No. 12/524,469 (9 pages)—Jul. 23, 2015.
Office action for co-pending U.S. Appl. No. 12/524,539 (13 pages)—Jun. 21, 2012.
Office action for co-pending U.S. Appl. No. 12/524,539 (13 pages)—Jun. 6, 2013.
Office action for co-pending U.S. Appl. No. 12/524,539 (12 pages)—Dec. 17, 2014.
Office action for co-pending U.S. Appl. No. 12/524,539 (7 pages)—Jul. 15, 2015.
Office action for co-pending U.S. Appl. No. 12/524,539 (7 pages)—Mar. 23, 2016.
Office action for co-pending U.S. Appl. No. 12/524,539 (7 pages)—Dec. 29, 2016.
Office action for co-pending U.S. Appl. No. 12/524,522 (4 pages)—Oct. 11, 2011.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Decision of USPTO Granting Ex Parte Re-exam of U.S. Pat. No. 9,828,287 (13 pages)—Jul. 17, 2020.
Decision of USPTO Granting Ex Parte Re-exam of U.S. Pat. No. 9,464,207 (14 pages)—Jul. 31, 2020.
Decision of USPTO Granting Ex Parte Re-exam of U.S. Pat. No. 9,926,464 (18 pages)—Aug. 5, 2020.
Decision of USPTO Granting Ex Parte Re-exam of U.S. Pat. No. 8,940,089 (17 pages)—Oct. 16, 2020.
Decision of USPTO Granting Ex Parte Re-exam of U.S. Pat. No. 9,039,827 (16 pages)—Oct. 16, 2020.
Decision of USPTO Granting Ex Parte Re-exam of U.S. Pat. No. 9,469,747 (16 pages)—Nov. 9, 2020.
Decision of USPTO Granting Ex Parte Re-exam of U.S. Pat. No. 9,464,207 (19 pages)—Aug. 27, 2021.
Office Action in Ex Parte Reexamination of U.S. Pat. No. 9,464,207 (14 pages)—Sep. 9, 2022.
Notice of Intent to Issue Ex Parte Re-examination Certificate re U.S. Pat. No. 9,464,207 (9 pages)—Jun. 8, 2023.
Decision of USPTO Granting Ex Parte Re-exam of U.S. Pat. No. 9,926,464 (16 pages)—Sep. 7, 2021.
Office Action in Ex Parte Reexamination of U.S. Pat. No. 9,926,464 (15 pages)—Mar. 21, 2023.
Notice of Intent to Issue Ex Parte Re-examination Certificate re U.S. Pat. No. 9,926,464 (6 pages)—Jul. 25, 2023.
Decision of USPTO Granting Ex Parte Re-exam of U.S. Pat. No. 9,469,747 (10 pages)—Sep. 16, 2021.
Office Action in Ex Parte Reexamination of U.S. Pat. No. 9,469,747 (9 pages)—Feb. 28, 2023.
Notice of Intent to Issue Ex Parte Re-examination Certificate re U.S. Pat. No. 9,469,747 (6 pages)—Jul. 25, 2023.
Decision of USPTO Granting Ex Parte Re-exam of U.S. Pat. No. 8,114,210 (13 pages)—Dec. 1, 2021.
Office Action in Ex Parte Reexamination of U.S. Pat. No. 8,114,210 (11 pages)—Mar. 27, 2023.
Notice of Intent to Issue Ex Parte Re-examination Certificate re U.S. Pat. No. 8,114,210 (6 pages)—Aug. 8, 2023.
Decision of USPTO Granting Ex Parte Re-exam of U.S. Pat. No. 8,940,089 (13 pages)—Jan. 28, 2022.
Office Action in Ex Parte Reexamination of U.S. Pat. No. 8,940,089 (11 pages)—Jul. 17, 2023.
Decision of USPTO Granting Ex Parte Re-exam of U.S. Pat. No. 9,828,287 (11 pages)—Feb. 1, 2022.
Office Action in Ex Parte Reexamination of U.S. Pat. No. 9,828,287 (9 pages)—Feb. 28, 2023.
Notice of Intent to Issue Ex Parte Re-examination Certificate re U.S. Pat. No. 9,828,287 (6 pages)—Jul. 25, 2023.
Decision of USPTO Granting Ex Parte Re-exam of U.S. Pat. No. 9,039,827 (13 pages)—Feb. 1, 2022.
Office Action in Ex Parte Reexamination of U.S. Pat. No. 9,039,827 (11 pages)—Aug. 16, 2023.
Notice of Intent to Issue Ex Parte Reexamination Certificate for U.S. Pat. No. 8,114,210 (4 pages)—May 27, 2021.
Notice of Intent to Issue Ex Parte Reexamination Certificate for U.S. Pat. No. 9,464,207 (4 pages)—Apr. 19, 2021.
Notice of Intent to Issue Ex Parte Reexamination Certificate for U.S. Pat. No. 9,828,287 (5 pages)—May 5, 2021.
Notice of Intent to Issue Ex Parte Reexamination Certificate for U.S. Pat. No. 9,926,464 (5 pages)—May 5, 2021.
Notice of Intent to Issue Ex Parte Reexamination Certificate for U.S. Pat. No. 9,469,747 (8 pages)—May 21, 2021.
Notice of Intent to Issue Ex Parte Reexamination Certificate for U.S. Pat. No. 9,039,827 (3 pages)—Jul. 2, 2021.

(56) References Cited

OTHER PUBLICATIONS

Notice of Intent to Issue Ex Parte Reexamination Certificate for U.S. Pat. No. 8,940,089 (4 pages)—Jul. 13, 2021.
Petition for Post Grant Review of U.S. Pat. No. 10,968,629 (50 pages, filed Jan. 6, 2022 by Petitioner Rockwool International A/S).
Denial of Petition for Post Grant Review of U.S. Pat. No. 10,968,629 entered by Patent Trial and Appeal Board (19 pages)—Jul. 6, 2022.
Statement of Revocation Grounds re GB2496951—Claimant Rockwool International (May 21, 2018, 22 pages).
Statement of Revocation Grounds re GB2451719—Claimant Rockwool International (May 18, 2018, 22 pages).
Expert Report re Revocation of GB2451719 and GB2496951—Claimant Rockwool International (Nov. 12, 2018, 11 pages).
United Kingdom Intellectual Property Office, Decision in *Rockwool International* v. *Knauf Insulation Limited*, Application under Section 72 for revocation of patents GB2451719 and GB2496951 (May 28, 2019—18 pages).
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).
Office action for co-pending U.S. Appl. No. 15/172,432 (16 pages)—Apr. 17, 2017.
Office action for co-pending U.S. Appl. No. 15/702,087 (5 pages)—Nov. 9, 2018.
Office action for co-pending U.S. Appl. No. 15/177,442 (17 pages)—May 19, 2017.
Office action for co-pending U.S. Appl. No. 15/378,159 (18 pages)—Mar. 2, 2017.
Office action for co-pending U.S. Appl. No. 15/222,122 (8 pages)—Nov. 20, 2017.
Office action for co-pending U.S. Appl. No. 15/310,837 (13 pages)—Jun. 21, 2018.
Office action for co-pending U.S. Appl. No. 15/411,972 (9 pages)—Mar. 28, 2017.
Office action for co-pending U.S. Appl. No. 15/411,972 (8 pages)—Nov. 29, 2017.
Office action for co-pending U.S. Appl. No. 15/411,972 (9 pages)—Jun. 14, 2018.
Office action for co-pending U.S. Appl. No. 15/116,254 (8 pages)—Apr. 26, 2018.
Office action for co-pending U.S. Appl. No. 15/116,254 (10 pages)—Aug. 15, 2018.
Office action for co-pending U.S. Appl. No. 15/116,254 (12 pages)—Nov. 3, 2021.
Office action for co-pending U.S. Appl. No. 15/333,670 (5 pages)—Dec. 8, 2017.
Office Action for co-pending U.S. Appl. No. 14/116,048 (10 pages)—Jun. 23, 2017.
Office action for co-pending U.S. Appl. No. 15/959,131 (8 pages)—Nov. 8, 2019.
Office action for co-pending U.S. Appl. No. 15/822,102 (6 pages)—Dec. 6, 2019.
Office action for co-pending U.S. Appl. No. 15/690,623 (7 pages)—May 24, 2019.
Office action for co-pending U.S. Appl. No. 15/690,623 (6 pages)—Jan. 9, 2020.
Office action for co-pending U.S. Appl. No. 16/357,320 (7 pages)—Jun. 10, 2021.
Office action for co-pending U.S. Appl. No. 16/357,320 (9 pages)—Dec. 29, 2021.
Office action for co-pending U.S. Appl. No. 16/357,320 (9 pages)—Apr. 14, 2022.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
1st Petition for Inter Partes Review of U.S. Pat. No. D. 631,670 (68 pages, filed Jun. 19, 2015 by Petitioners Johns Manville Corporation and Johns Manville, Inc.).
2nd Petition for Inter Partes Review of U.S. Pat. No. D. 631,670 (62 pages, filed Nov. 2, 2015 by Petitioners Johns Manville Corporation and Johns Manville, Inc.).
Decision of PTAB regarding Institution of Inter Partes Review for U.S. Pat. No. D. 631,670 (33 pages)—Jan. 12, 2016.
Decision2 of PTAB regarding Institution of Inter Partes Review for U.S. Pat. No. D. 631,670 (27 pages)—May 9, 2016.
Final Written Decision of PTAB regarding Inter Partes Review of U.S. Pat. No. D. 631,670 based on 1st Petition (56 pages)—Jan. 11, 2017.
Final Written Decision of PTAB regarding Inter Partes Review of U.S. Pat. No. D. 631,670 based on 2nd Petition (55 pages)—May 8, 2017.
Court of Appeals for Federal Circuit Judgment from Appeal of PTAB Decisions in Inter Partes Reviews of U.S. Pat. No. D. 631,670 (2 pages)—Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed July 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed July 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with 1st Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with 2nd Petition for Inter Partes Review of U.S. Pat. No. 9,039,827).
3rd Petition for Inter Partes Review of U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with 3rd Petition for Inter Partes Review of U.S. Pat. No. 9,039,827).
Declaration of Dr. Elam Leed (11 pages, filed Jul. 29, August 5, and Aug. 7, 2015 by Petitioners Johns Manville Corporation and Johns

(56) References Cited

OTHER PUBLICATIONS

Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Petition for Inter Partes Review of U.S. Pat. No. 9,469,747 (67 pages, filed Mar. 20, 2018 by Petitioners Johns Manville Corporation and Johns Manville, Inc.).
Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Office Action Granting Ex Parte Reexamination of U.S. Pat. No. 7,888,445, mailed Dec. 24, 2013, in Control No. 90/013,029, 11 pages.
Office Action Granting Ex Parte Reexamination of U.S. Pat. No. 7,772,347, mailed Dec. 24, 2013, in Control No. 90/013,030, 14 pages.
Office Action Granting Ex Parte Reexamination of U.S. Pat. No. 7,854,980, mailed Apr. 15, 2014, in Control No. 90/013,156, 20 pages.
Declaration of Jan Rud Andersen submitted in Ex parte Reexamination Control No. 90/013,030, as Document OTH-C, Oct. 10, 2013, 4 pages.
Final Rejection in Ex Parte Reexamination of U.S. Pat. No. 7,888,445 (20 pages)—Jul. 24, 2015.
Final Rejection in Ex Parte Reexamination of U.S. Pat. No. 7,772,347 (23 pages)—Jul. 24, 2015.
Final Rejection in Ex Parte Reexamination of U.S. Pat. No. 7,854,980 (31 pages)—Aug. 18, 2015.
Advisory Action in Ex Parte Reexamination of U.S. Pat. No. 7,888,445 (4 pages)—Oct. 6, 2015.
Advisory Action in Ex Parte Reexamination of U.S. Pat. No. 7,772,347 (4 pages)—Oct. 6, 2015.
Advisory Action in Ex Parte Reexamination of U.S. Pat. No. 7,854,980 (4 pages)—Nov. 18, 2015.
Examiner's Answer in Ex Parte Reexamination of U.S. Pat. No. 7,888,445 (8 pages)—Mar. 23, 2016.
Examiner's Answer in Ex Parte Reexamination of U.S. Pat. No. 7,772,347 (8 pages)—Mar. 23, 2016.
Examiner's Answer in Ex Parte Reexamination of U.S. Pat. No. 7,854,980 (8 pages)—Mar. 22, 2016.
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of PTAB Decisions in Ex Parte Reexamination of U.S. Pat. Nos. 7,888,445, 7,772,347 and 7,854,980 (5 pages)—Mar. 9, 2018.
Notice of Intent to Issue Ex Parte Reexamination Certificate for U.S. Pat. No. 7,772,347 (4 pages)—Oct. 24, 2018.
Notice of Intent to Issue Ex Parte Reexamination Certificate for U.S. Pat. No. 7,888,445 (4 pages)—Dec. 7, 2018.
Notice of Intent to Issue Inter Partes Reexamination Certificate for U.S. Pat. No. 7,888,445 (14 pages)—Sep. 24, 2020.
Notice of Intent to Issue Inter Partes Reexamination Certificate for U.S. Pat. No. 7,772,347 (13 pages)—Sep. 25, 2020.
Decision of USPTO to Reopen Prosecution in Ex Parte Reexamination of U.S. Pat. No. 7,854,980 (7 pages)—Jan. 7, 2019.
Non-final Office Action from Reopened Prosecution in Ex Parte Reexamination of U.S. Pat. No. 7,854,980 (26 pages)—Apr. 3, 2019.
Final Office Action from Reopened Prosecution in Ex Parte Reexamination of U.S. Pat. No. 7,854,980 (11 pages)—Aug. 8, 2019.
Notice of Intent to Issue Ex Parte Reexamination Certificate for U.S. Pat. No. 7,854,980 (3 pages)—Oct. 29, 2019.
Notice of Intent to Issue Inter Partes Reexamination Certificate for U.S. Pat. No. 7,807,771 (4 pages)—Jan. 30, 2014.
Notice of Intent to Issue Inter Partes Reexamination Certificate for U.S. Pat. No. 7,854,980 (6 pages)—Aug. 31, 2017.
Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9, 2015.
Examiner's Determination on Patent Owner Response/Requester Comments after Board Decision in Inter Partes Reexamination of U.S. Pat. No. 7,888,445 (22 pages)—Oct. 17, 2016
Examiner's Determination on Patent Owner Response/Requester Comments after Board Decision in Inter Partes Reexamination of U.S. Pat. No. 7,772,347 (17 pages)—Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.
Final Decision of PTAB in Inter Partes Reexamination of U.S. Pat. No. 7,888,445 (25 pages)—Sep. 8, 2017.
Final Decision of PTAB in Inter Partes Reexamination of U.S. Pat. No. 7,772,347 (24 pages)—Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Court of Appeals for Federal Circuit Decision re Consolidated Appeal of PTAB Decision in Inter Partes Reexamination of U.S. Pat. No. 7,772,347 and U.S. Pat. No. 7,888,445 (14 pages)—Oct. 15, 2019.
Remand Order of PTAB in Inter Partes Reexamination of U.S. Pat. No. 7,888,445 (3 pages)—Jul. 1, 2020.
Remand Order of PTAB in Inter Partes Reexamination of U.S. Pat. No. 7,772,347 (3 pages)—Jul. 1, 2020.
Decision of PTAB regarding Institution of Inter Partes Review for U.S. Pat. No. 8,114,210 (20 pages)—Oct. 21, 2015.
Final Written Decision of PTAB regarding Inter Partes Review of U.S. Pat. No. 8,114,210 (39 pages)—Oct. 19, 2016.
Court of Appeals for Federal Circuit Judgment from Appeal of PTAB Decision in Inter Partes Review of U.S. Pat. No. 8,114,210 (5 pages)—Jan. 16, 2018.
Decision of USPTO Granting Ex Parte Re-exam of U.S. Pat. No. 8,114,210 (11 pages)—Apr. 9, 2020.
Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
U.S. Pat. No. 2,965,504—Part 1 (10 pages)—Dec. 20, 1960.
U.S. Pat. No. 2,965,504—Part 2 (14 pages)—Dec. 20, 1960.
U.S. Pat. No. 2,965,504—Part 3 (14 pages)—Dec. 20, 1960.

\* cited by examiner

BINDER COMPOSITIONS AND USES THEREOF

CROSS-REFERENCE TO RELATED APPLICATIONS

This application is a continuation of U.S. application Ser. No. 17/386,445, filed Jul. 27, 2021, which is a continuation of U.S. application Ser. No. 17/323,991, filed May 18, 2021, which is a continuation of U.S. application Ser. No. 17/194,269, filed Mar. 7, 2021, which is a continuation of U.S. application Ser. No. 17/129,787 (now abandoned), filed Dec. 21, 2020, which is a continuation of U.S. application Ser. No. 17/063,630 (now abandoned), filed Oct. 5, 2020, which is a continuation of U.S. application Ser. No. 16/941,474 (now abandoned), filed Jul. 28, 2020, which is a continuation of U.S. application Ser. No. 15/931,565 (now abandoned), filed May 13, 2020, which is a continuation of U.S. application Ser. No. 15/326,532, filed Jan. 16, 2017, which is a U.S. national counterpart application of International Application Serial No. PCT/EP2015/066455, filed Jul. 17, 2015, under 35 U.S.C. § 371, which claims priority to GB Application Serial No. 1412709.6, filed Jul. 17, 2014, the disclosures of which are hereby incorporated herein by reference.

TECHNICAL FIELD AND SUMMARY

The present invention relates to new improved binder compositions, more specifically curable binder compositions for use in manufacturing products from a collection of non or loosely assembled matter. For example, these binder compositions may be employed to fabricate fiber products which may be made from woven or nonwoven fibers. In one illustrative embodiment, the binder compositions are used to bind glass fibers to make fiberglass. In another illustrative embodiment, the binder compositions are used to bind mineral wool fibers, such as glass wool or stone wool in a matted layer, such as an insulating product. In a further embodiment, the binders are used to make cellulosic compositions. With respect to cellulosic compositions, the binders may be used to bind cellulosic matter to fabricate, for example, wood fiber board or particle board which has desirable physical properties (e.g., mechanical strength). The invention further extends to a product made from loosely assembled matter bound by a binder of the invention.

BACKGROUND

Several formaldehyde-free binder compositions have been developed in recent times. One such curable binder composition involves sustainable materials and is based on polyester chemistry, more particularly curable aqueous binder compositions comprising a polyacid component or anhydride or salt derivatives thereof, and a polyhydroxy component, possibly together with a silicon containing compound. Another such composition involves the condensation of ammonium salt of inorganic acids or of polycarboxylic acids or an amine, preferably a polyamine, with reducing sugars as thermosets. These chemistries show advantages as compared to prior formaldehyde based technology, but also show certain weaknesses, and there still is a need for improved binder chemistry. Some of the known binder chemistries show a relatively high binder weight loss upon exposure to heat. Some also show undesirable degradation in humid environments which may negatively affect the bond strength properties of the products containing same. There further is an ongoing interest in improving the bond strength of the employed binder compositions, hence providing improved final products, showing improved properties, and/or final products with reduced binder content, at more advantageous costs.

OBJECTS OF THE INVENTION

The present invention seeks to provide binders which generate or promote cohesion and are capable of holding a collection of matter together such that the matter adheres in a manner to resist separation. An objective of the present invention is to provide binders showing improved bond strength, as compared to close prior art binder compositions, more particularly such binder compositions based on polyester chemistry or the condensation of ammonium salt of inorganic acid or ammonium salt of polycarboxylic acids or amine with reducing sugars as thermosets.

Another objective of the present invention is to provide cost-effective binder compositions for large volume applications.

Another objective is to provide a binder composition based on renewable and/or sustainable resources.

Further, the invention seeks to provide binder compositions that rapidly cure into strong binders.

Yet another purpose of the invention is to provide an assembly of matter bonded with the invention binder.

DETAILED DESCRIPTION

Figure 1:
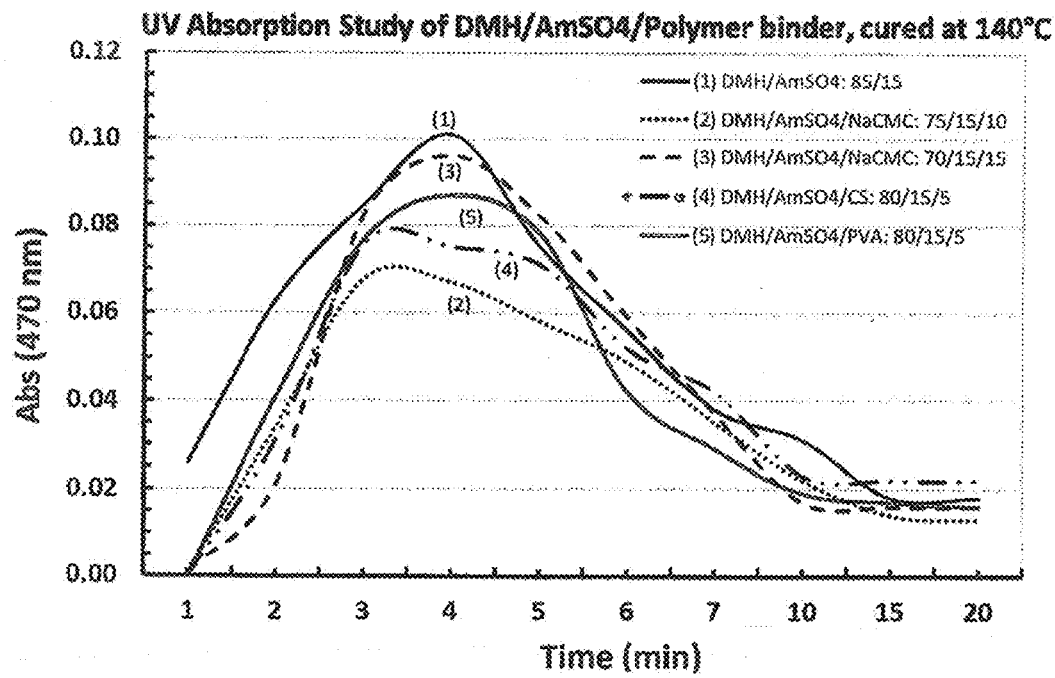
FIGS. 1-3 show the cure rate of several binder compositions.

The present invention now provides an aqueous curable binder composition comprising the starting materials required for forming a thermoset resin upon curing and a matrix polymer.

The matrix polymer may be of natural and/or synthetic origin. These polymers may act as an active filling agent in the binder formulation, and may form intra- and inter-molecular chain interactions. Naturally derived polymers may advantageously be selected from polysaccharides, such as chitosan, cellulose and its derivatives, such as cellulose ether and ester derivatives. The cellulose ether derivatives can be prepared by carboxymethylation, carboxyethylation and carboxypropylation. Examples of preferred cellulose ether derivatives are: nanocellulose, carboxymethyl cellulose (CMC), sodium carboxymethyl cellulose (NaCMC), hydroxypropyl cellulose (HPC), hydroxyethyl cellulose (HEC), hydroxypropylmethyl cellulose (HPMC), methyl cellulose (MC), ethyl cellulose (EC), trityl cellulose, and so on. The preferred cellulose ester derivatives include acetates, butyrates, benzoates, phthalates and anthranilic acid esters of cellulose, preferably, cellulose acetate phthalate (CAP), cellulose acetate butyrate (CAB), cellulose acetate trimelitate (CAT), hydroxylpropylmethyl cellulose phthalate (HPMCP), succinoyl cellulose, cellulose fuoroate, cellulose carbanilate, and mixtures thereof. In some binder compositions cationic cellulose derivatives may be used. Some binder compositions may comprise other polysaccharides such as alginates, starch, chitin and chitosan, agarose, hyaluronic acid, and their derivatives or copolymers (e.g., graft-copolymer, block copolymer, random copolymers), or mixtures thereof.

Chitosan is a polysaccharide derived from crustacean shells, like shrimp shells. Chitosan may have different molecular weights and deacetylation degrees. Preferred are molecular weights between 500 Daltons and $2 \cdot 10^6$ Daltons, more preferably between $60 \times 10^3$ and $2 \times 10^5$ Da.

Synthetically derived polymers may include polyacrylates, polymethacrylates, polyacrylamides, polymethacrylamides, polyurethanes, polyesters, polyvinyls and/or their copolymers, aliphatic isocyanate oligomers, azetidinium groups containing polymer (azetidinium polymer) or mixtures thereof.

In one embodiment the binder formulation may comprise polyacrylate, polymethacrylate or polyacrylamide or mixtures thereof, which may be formed from polymerisation of one or more, typically two or three, monomers, which may be present in differing amounts. Preferably the one of the monomers is a substituted alkyl methacrylate or acrylate monomer. The alkyl group of the substituted alkyl function may have from 1 to 10, preferably 1 to 4 carbon atoms and the substituent group may be an alkoxy group with 1 to 4 carbon atoms, such as a methoxy group, or a dialkylamino group, such as dimethylamino. Particularly preferred acrylate monomers are: 2-methoxyacrylate (MEA), 3,5,5-trimethylhexyl acrylate (TMHA), ethylene glycol acrylate (EGA), 2-ethoxyethyl acrylate (EOEA), ethylene glycol diacrylate (EGDA), ethyl 2-ethylacrylate (EEA), (ethylcyano)acrylate (ECA), ethyl 2-propyl acrylate (EPA), ethyl 2-(trimethylsilylmethyl)acrylate (ETMSMA), butyl acrylate (BA), butylcyclohexyl acrylate (BCHA), benzyl 2-propyl acrylate (BPA), carboxyethyl acrylate (CEA), 2-(diethylamino)ethyl acrylate (DEAEA), 2-(diethylamino)propyl acrylate (DEAPA). The examples of preferred metharcylate monomers are: methylmethacrylate (MMA), 2-hydroxyethyl methacrylate (HEMA), 2-methoxymethacrylate (MEMA), 2-(diethylamino) ethyl methacrylate (DEAEMA), 2-aminoethyl methacrylate (AEMA), benzyl methacrylate (BMA), 2-butoxyethyl methacrylate (BEMA), 2-(tert-butylamino)ethyl methacrylate (TBAEMA), cyclohexyl methacrylate (CHMA), ethylene glycol methacrylate (EGMA), 2-(diisopropylamino)ethyl methacrylate (DIPAEMA). Preferred acrylamide/methacrylamide monomers are: alkylacrylamide (AAAm), butylacrylamide (BAAm), diethylacrylamide(DEAAm), N,N-dimethyl acrylamide (DMAAm), ethylacrylamide (EAAm), hydroxyethyl acrylamide (HEAAm), hydroxymethyl acrylamide (HMAAm), N-isopropyl acrylamide (NIPAAm), N,N-diethylmethacrylamide (DEMAAm), N-diphenyl methacrylamide (DP-MAAm). Preferred polymers comprise two or more monomers and typically a mixture of MEMA or MEA, and DEAEMA or vise versa, in the range between 5:95 and 95:5 percent by weight, advantageously from 10:90 to 90:10, preferably from 20:80 to 80:20, more preferably from 30:70 to 70:30. Optionally further monomers may be present, such as acrylic acid (AA) or methacrylic acid (MAA) in a weight ratio of 1 to 10 percent, preferably about 5 percent by weight. A suitable polymer includes MEMA, DEAEMA and AA in a ratio of 55:40:5 to 75:20:5. Such polymers may comprise one or more monomers which include an aryl group, such as styrene (St) and optionally a dialkylacrylamide group (alkyl representing 1 to 4 carbon atoms), such as dimethylacrylamide (DMAA); and diethylacrylamide (DEAA). Preferably the polymers comprise two monomers selected from styrene and a dialkylacrylamide. Preferred polymers comprise, or consist of the following monomers: St:DMAA and St:DEAA and which may be present in the range of ratios between 40:60 and 95:5. Additional polymers which may be used in binder formulations of the invention may comprise MEA (2-methoxyacrylate) and a dialkylacrylamide group (alkyl representing 1 to 4 carbon atoms), such as dimethylacrylamide (DMAA); and diethylacrylamide (DEAA). Preferred polymers comprise or consist of MEA: DMAA and MEA:DEAA, which may be present in the ratios between 30-80:70-20 respectively.

According to another embodiment of the invention, the binder composition may comprise a polyurethane matrix polymer which provides bond strength and faster curing. Polyurethane polymers may be formed by polymerising a polydiol with a diisocyanate and optionally with an extender molecule, such as a diol. The extender molecules have the effect of modifying the physical character of the polymers, for example, polymer shape, viscosity and polymer state. The polydiol may be selected from the group consisting of but not limited to, poly(polypropylene glycol)-poly(ethylene glycol) (PPG-PEG), polyethylene glycol (PEG), poly(caprolactone)-diol (PCL-diol), poly(lactic acid)-diol (PLA-diol), poly(glycolic acid)-diol (PGA-diol), poly(tetramethylene glycol) (PTMG) also known as poly(butylene glycol), poly [1,6-hexanediol/neopentyl glycol-alt-(adipic acid)]diol (PHNAD), poly[1,6-hexanediol/neopentyl glycol/diethylene glycol-alt-(adipic acid)]diol (PHNDGAD), poly(dimethyl siloxane)-diol (PDMS). The molecular weight of the polydiol may range from $M_n$=200 to $M_n$=7000 and it may be present in an amount of 15-55% by weight, such as 20-50% by weight of the polymer. The diisocyanate may be selected from the group consisting of but not limited to methylene diphenyl diisocyanate (MDI), 1,4-phenylene diisocyanate (PDI), 1,1'-methylenebis(4-isocyanatocyclohexane) (HMDI), 2,4-toluene diisocyanate (TDI), hexamethylene diisocyanate (HDI), 1,3-bis(isocynanatomethyl) cyclohexane (BICH). Typically the diisocyanate is present in an amount of 45-55% by weight of the polymer. Suitable extenders include 1,4-butanediol (BD), ethylene glycol (EG), 2,2,3,3,4,4,5,5-octafluoro-1,6-hexanediol (OFHD); and 3-dimethylamino-1,2-propanediol (DMAPD). When present, the extender may be present in an amount of 10-30 mol % of the polymer, typically 10-25%.

In yet another embodiment, the binder composition may comprise polyesters, copolymers or mixtures (blends) thereof. Non limiting examples of preferred polyesters are: polyglycolide or polyglycolic acid (PGA), polylactic acid (PLA), polycaprolactone (PCL), polyhydroxyalkanoate (PHA), polyhydroxybutyrate (PHB), polyethylene adipate (PEA), polybutylene succinate (PBS), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN), vectran, and/or their copolymers such as PCL-PLA, PCL-PGA, PLA-PGA, PCL-PLA-PCL, PIBVE-b-PCL, and others.

Furthermore, the binder composition of the invention may comprise vinyl polymers and amic acid based polymers, such as poly(pyromellitic dianhydride-co-4,4'oxodianiline) amic acid. Preferably, these may include polyethylene, polypropylene, polybutadiene, polyvinyl chloride (PVC), polyvinyl acetate (PVAc), polyvinyl alcohol (PVA), partially hydrolized polyvinyl acetate, polyacrylonitrile (PAN), polyvinyl butyral (PVB), and polyvinyl toluene (PVT) and/or their copolymers such as PVA-b-PS, PS-b-PMMA, PS-b-PAN, PVA-PGMA, or mixtures thereof. The above said polymers may be incorporated into the binder formulation in homogeneous (aqueous solution) or heterogeneous (emulsion) systems. The solution or emulsion polymers may be present in the composition in an amount ranging from 0.5% up to 50% by weight based on total solids.

In another preferred embodiment, the binder composition may comprise an azetidinium polymer. Such material is known per se and may be obtained by the reaction of a polyamidoamine and a halohydrin. An azetidinium polymer is made up of at least two monomeric units containing a substituted or unsubstituted four membered nitrogen containing heterocycle. The azetidinium polymer may be a homopolymer or a copolymer comprising one or more non-azetidinium monomer units incorporated into the polymer structure. A preferred polyazetidinium suitable for use in accordance with the invention shows the formula

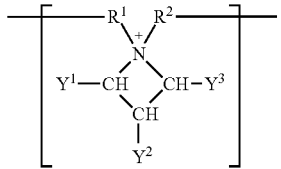

wherein $R_1$ may be $C_1$-$C_{25}$ alkanediyl, preferably $C_1$-$C_{10}$ alkanediyl or $C_1$-$C_5$ alkanediyl, possibly substituted with a hydroxyl group, carboxyl functional group or an amine, $R_2$ may be independently R1 or —$R_3$—NH—C(O)—R4—, with $R_3$ and $R_4$ being independently $C_1$-$C_{25}$ alkanediyl, preferably $C_1$-$C_{10}$ alkanediyl or $C_1$-$C_5$ alkanediyl, $Y_1$ and $Y_3$ being H or a C1-C5 alkyl group, possibly substituted with a hydroxyl group, an amine or a carboxyl group, Y2 being OH or independently Y1, $X^-$ being a halogen counter ion.

An example of such an azetidinium polymer is the product coded CA1025.

Carbohydrate based binders or binder compositions may comprise polymer micro- and/or nano-particles. Preferred micro- and/or nano-particles derived from natural polymers are selected from polysaccharides, such as chitin and chitosan, cellulose and its derivatives, such as cellulose ether and ester derivatives, alginates, starch, agarose, hyaluronic acid, and their derivatives or copolymers, and mixtures thereof. Preferable nano materials are nanocelluloses such as cellulose nanocrystals or cellulose nanowhiskers or nanofibres and/or mixtures thereof.

Synthetically derived polymer micro- and/or nano-particles particularly suitable for carbohydrate based binders are advantageously selected from polyacrylates, polymethacrylates, polyacrylamides, polymethacrylamides, polyurethanes, polyesters, and aliphatic isocyanate oligomers, or copolymers and/or mixtures thereof.

The weight ratio of the matrix polymer may make up from about 1 to 20% dry weight of the binder composition, preferably from about 2 to 18% dry weight, more preferably from 5 to 15% dry weight of the composition.

The said matrix polymers, more specifically the polymers exemplified above, may show a molecular weight ranging from 500 Daltons (Da) to $2\times10^6$ Da, preferably from $1\times10^3$-$5\times10^5$ Da, more preferably $5\times10^4$ Da-$3\times10^5$ Da.

One or more pre-formed polymers, or monomers, possibly together with initiator, may be emulsion dispersed or solubilised in the binder composition.

It has been found that by adding additional matrix polymer into the binder composition comprising the starting materials for forming the desired binder resin upon curing, higher bonding strength may be obtained. The addition of such matrix polymer may further reduce the binder loss upon curing of the binder resin. Also, the addition of a matrix polymer reduces the water absorption of the binder, as compared to the same binder which includes no additional matrix polymer.

When a polyester resin type binder is desired, the starting materials are selected from compounds bearing hydroxide functional groups and compounds bearing carboxylic acid functional groups, or anhydride or salt derivatives thereof, such that upon curing under appropriate curing conditions the desired polyester resin is obtained. Such polyester based resins are well known in the technical field. As mentioned above, the hydroxide functional compound may be selected from carbohydrates, such as dextrose, and the compound bearing carboxylic acid functional groups, or anhydride or salt derivatives thereof, may be selected from polycarboxylic acid, anhydride or salt thereof.

The polycarboxylic acid may advantageously be selected from monomeric and polymeric polycarboxylic acids. Illustratively, a monomeric polycarboxylic acid may be a dicarboxylic acid, including, but not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like. Or, illustratively, the polycarboxylic acid(s) itself may be a tricarboxylic acid, including, but not limited to, unsaturated aliphatic tricarboxylic acids, saturated aliphatic tricarboxylic acids, aromatic tricarboxylic acids, unsaturated cyclic tricarboxylic acids, saturated cyclic tricarboxylic acids, hydroxy-substituted derivatives thereof, and the like. It is appreciated that any such polycarboxylic acids may be optionally substituted, such as with hydroxy, halo, alkyl, alkoxy, and the like. In one variation, the polycarboxylic acid is the saturated aliphatic tricarboxylic acid, citric acid. Other suitable polycarboxylic acids are contemplated to include, but are not limited to, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, maleic acid, malic acid, mesaconic acid, bisphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, and the like, and anhydrides, and combinations thereof. Illustratively, a polymeric polycarboxylic acid may be an acid, for example, polyacrylic acid, polymethacrylic acid, polymaleic acid, and like polymeric polycarboxylic acids, copolymers thereof, anhydrides thereof, and mixtures thereof. Examples of commercially available polyacrylic acids include AQUASET-529 (Rohm & Haas, Philadelphia, Pa., USA), CRITERION 2000 (Kemira, Helsinki, Finland, Europe), NF1 (H. B. Fuller, St. Paul, Minn., USA), and SOKALAN (BASF, Ludwigshafen, Germany, Europe). With respect to SOKALAN, this is a water-soluble polyacrylic copolymer of acrylic acid and maleic acid, having a molecular weight of approximately 4000. AQUASET-529 is a composition containing polyacrylic acid cross-linked with glycerol, also containing sodium hypophosphite as a catalyst. CRITERION 2000 is an acidic solution of a partial salt of polyacrylic acid, having a molecular weight of approximately 2000. With respect to NF1, this is a copolymer containing carboxylic acid functionality and hydroxy functionality, as well as units with neither functionality; NF1 also contains chain transfer agents, such as sodium hypophosphite or organophosphate catalysts.

As described in U.S. Pat. Nos. 5,318,990 and 6,331,350, the polymeric polycarboxylic acid comprises an organic polymer or oligomer containing more than one pendant carboxy group. The polymeric polycarboxylic acid may be a homopolymer or copolymer prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. Alternatively, the polymeric polycarboxylic acid may be prepared from unsaturated anhydrides including, but not necessarily limited to, maleic anhydride, itaconic anhydride, acrylic anhydride, methacrylic anhydride, and the like, as well as mixtures thereof. Methods for polymerizing these acids and anhydrides are well-known in the chemical art. The polymeric polycarboxylic acid may additionally comprise a copolymer of one or more of the aforementioned unsaturated carboxylic acids or anhydrides and one or more vinyl compounds including, but not necessarily limited to, styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. Methods for preparing these copolymers are well-known in the art. The polymeric polycarboxylic acids may comprise homopolymers and copolymers of polyacrylic acid. The molecular weight of the polymeric polycarboxylic acid, and in particular polyacrylic acid polymer, may be is less than 10000 Da, less than 5000 Da, or about 3000 Da or less. For example, the molecular weight may be 2000 Da.

The carbohydrate may include one or more reactants having one or more reducing sugars. In one aspect, any carbohydrate reactant should be sufficiently nonvolatile to maximize its ability to remain available for reaction with the amine reactant. The carbohydrate reactant may be a monosaccharide in its aldose or ketose form, including a triose, a tetrose, a pentose, a hexose, or a heptose; or a polysaccharide; or combinations thereof. A carbohydrate reactant may be a reducing sugar, or one that yields one or more reducing sugars in situ under thermal curing conditions. For example, when a triose serves as the carbohydrate reactant, or is used in combination with other reducing sugars and/or a polysaccharide, an aldotriose sugar or a ketotriose sugar may be utilized, such as glyceraldehyde and dihydroxyacetone, respectively. When a tetrose serves as the carbohydrate reactant, or is used in combination with other reducing sugars and/or a polysaccharide, aldotetrose sugars, such as erythrose and threose; and ketotetrose sugars, such as erythrulose, may be utilized. When a pentose serves as the carbohydrate reactant, or is used in combination with other reducing sugars and/or a polysaccharide, aldopentose sugars, such as ribose, arabinose, xylose, and lyxose; and ketopentose sugars, such as ribulose, arabulose, xylulose, and lyxulose, may be utilized. When a hexose serves as the carbohydrate reactant, or is used in combination with other reducing sugars and/or a polysaccharide, aldohexose sugars, such as glucose (i.e., dextrose), mannose, galactose, allose, altrose, talose, gulose, and idose; and ketohexose sugars, such as fructose, psicose, sorbose and tagatose, may be utilized. When a heptose serves as the carbohydrate reactant, or is used in combination with other reducing sugars and/or a polysaccharide, a ketoheptose sugar such as sedoheptulose may be utilized. Other stereoisomers of such carbohydrate reactants not known to occur naturally are also contemplated to be useful in preparing the binder compositions as described herein. When a polysaccharide serves as the carbohydrate, or is used in combination with monosaccharides, sucrose, lactose, maltose, starch, and cellulose may be utilized. The carbohydrate component may advantageously comprise oligomers or polymers that result from the hydrolysis of a polysaccharide, such as starch, cellulose or molasses. Such hydrolysates are capable of generating reducing sugars in situ and/or already comprise reducing sugars and further may contribute to the effect of the matrix polymer. Preferred are hydrolysates that show a DE (dextrose equivalent) of 25 to 90, preferably 35 to 85, or 45 to 85, most preferably 55 to 80.

When Maillard compounds based binders are desired, that means binders based on the reaction between a reducing sugar and a nitrogen containing compound, the carbohydrate compound may advantageously be selected from the carbohydrates mentioned here above. Among these dextrose is the most preferred. The nitrogen containing compound may advantageously be selected from ammonium salt of inorganic acids or organic acids and amine compounds.

The inorganic acid part of ammonium salt may advantageously be selected from phosphoric, sulphuric, nitric and carbonic acid. Ammonium sulphate and ammonium phosphate are preferred. The organic acid may be selected from the polycarboxylic acids mentioned here above.

The amine compound may advantageously be selected from polyamine functional compounds comprising primary and/or secondary amine functional groups. In illustrative embodiments, the polyamine is a primary polyamine. In one embodiment, the polyamine may be a molecule having the formula of $H_2N-Q-NH_2$, wherein Q is an alkyl, cycloalkyl, heteroalkyl, or cycloheteroalkyl, each of which may be optionally substituted. In one embodiment, Q is an alkyl selected from a group consisting of $C_2$-$C_{24}$. In another embodiment, Q is an alkyl selected from a group consisting of $C_2$-$C_8$. In another embodiment, Q is an alkyl selected from a group consisting of $C_3$-$C_7$. In yet another embodiment, Q is a $C_6$ alkyl. In one embodiment, Q is selected from the group consisting of a cyclohexyl, cyclopentyl or cyclobutyl. In another embodiment, Q is a benzyl. In illustrative embodiments, the polyamine is selected from a group consisting of a di-amine, tri-amine, tetra-amine, and penta-amine. In one embodiment, the polyamine is a diamine selected from a group consisting of 1,6-diaminohexane and 1,5-diamino-2-methylpentane. In a preferred embodiment, the di-amine is 1,6-diaminohexane. In one embodiment, the polyamine is a tri-amine selected from a group consisting of diethylenetriamine, 1-piperazine-ethaneamine, and bis(hexamethylene)triamine. In another embodiment, the polyamine is a tetra-amine such as triethylenetetramine. In another embodiment, the polyamine is a penta-amine, such as tetraethylenepentamine. In another embodiment, the polyamine is selected from polyethyleneimine (PEI), polyninyl amine, polyether amine, polylysine. As is known to the skilled person, several different types of polyethylenimines are available, such as linear polyethylenimines, branched polyethylenimines and dendrimer type polyethylenimine; all are suitable in the binder compositions of the invention. Similarly, polyetheramines may show a linear form and branched forms, and all are believed to be suitable for the generation of binder compositions and, hence, binders of the invention.

The dry weight ratio of carbohydrate to ammonium salt of inorganic or polycarboxylic acid ranges from about 2 to about 15, preferably from about 2.5 to about 13. The matrix polymer may make up from about 1 to 20% dry weight of the binder composition, preferably from about 2 to 18% dry weight, more preferably from 5 to 15% dry weight of the composition.

The binder compositions of the invention and binders produced therefrom are essentially formaldehyde-free (that is comprising less than about 1 ppm formaldehyde based on the weight of the composition) and do not liberate substantial formaldehyde. They furthermore are based on natural, hence renewable, resources.

The invention compositions may obviously further comprise coupling agents, dyes, antifungal agents, antibacterial agents, hydrophobes and other additives known in the art for such binder applications, as may be appropriate. Silicon-containing coupling agents are typically present in such binders, generally in the range from about 0.1 to about 1% by weight based on the weight of the solids in the binder composition. These additives are obviously selected such as not to antagonise the adhesive properties of the binder nor the mechanical and other desired properties of the final product comprising such binder composition or binder produced therefrom, and advantageously comply with stringent environmental and health related requirements.

Without being bound by theory, it is believed that curing generates highly crosslinked high molecular weight polymers. These may be analysed by techniques generally known in the art, including determination of molecular weight, and other known techniques.

According to the present invention, the term "binder composition" is not particularly restricted and generally includes any composition which is capable of binding loosely assembled matter, either as such or upon curing.

As used herein, the term "aqueous" is not particularly limited and generally relates to a solution and/or dispersion which is based on water as a solvent. Said term further includes compositions or mixtures which contain water and one or more additional solvents. An "aqueous binder composition" of the invention may be a solution or partial solution of one or more of said binder components or may be a dispersion, such as an emulsion or suspension.

The solid content of the invention aqueous binder composition may range from 5 to 95 w %, advantageously from 8 to 90 w %, preferably from 10 to 85 w %, based on the weight of the total aqueous binder composition. More specifically, when used as a binder for mineral wool insulation, the solid content of the aqueous binder composition may be in the range from 5 to 25 w %, preferably from 8 to 20 w %, more preferably from 10 to 20 w % or even 12 to 18 w %, based on the weight of the total aqueous binder composition. When used as a binder in wood boards, the solid content of the aqueous binder composition may range from 50 to 95 w %, preferably 50 to 90 w %, more preferably 55 to 85 w % or even 60 to 80 w %, based upon the weight of the total aqueous binder composition.

Binder compositions of the invention may further comprise nano-particles derived from inorganic materials such as metal-oxides, preferably MgO, CaO, $Al_2O_3$ and $CaCO_4$. Furthermore, nanoclays may be incorporated in the binder formulations. Such nanoclays include, without being limited to, montmorillonite, bentonite, kaolinite, hectorite, and halloysite and other organically-modified nanoclays, and/or mixtures thereof. Such inorganic materials may be present in an amount ranging from 0.1 to 10 w %, preferably 0.1 to 5 w %, of solid content of the total composition.

The components of the invention binder compositions may be transported separately and combined shortly before use in the relevant manufacturing plant. It is also possible to transport the binder composition as such.

The binders of the invention may be used to bond a collection of non or loosely assembled matter. The collection of matter includes any collection of matter which comprises fibers selected from mineral fibers, including but not limited to slag wool fibers, stone wool fibers, glass fibers, aramid fibers, ceramic fibers, metal fibers, carbon fibers, polyimide fibers, polyester fibers, rayon fibers, and cellulosic fibers. Further examples of collection of matter include particulates such as coal, sand, cellulosic fibers, wood shavings, saw dust, wood pulp, ground wood, wood chips, wood strands, wood layers, other natural fibers, such as jute, flax, hemp, straw, wood veneers, facings and other particles, woven or non-woven materials. According to a specific embodiment of the invention, the collection of matter is selected from wood particles and mineral fibers.

In one illustrative embodiment, the binder composition of the invention may be used to make insulation products, comprising mineral fibers. In such an application, the fibers are bonded together such that they become organized in a fiberglass mat which may then be processed into an insulation product. In such an application, the fibers are generally present in an amount ranging from 70 to 99%.

According to another embodiment of the invention, the binder may be used to bond cellulosic particles, such as cellulosic fibers, wood shavings, wood pulp and other materials commonly used to manufacture composite wood boards, including fiber boards, particle boards, oriented strand boards etc. Such wood boards show nominal thicknesses ranging from 6 to 30 mm and a modulus of Elasticity of at least about 1000 $N/mm^2$, bending strength of at least about 5 $N/mm^2$ and/or an internal bond strength of at least 0.10 $N/mm^2$. In such applications, the binder content in the final wood board may range from about 5 to 30% wt with respect to the total weight of the wood board notably from 9 to 20%.

According to the invention, the aqueous binder composition may be applied in a manner known per se onto the fiber or particular material. The binder composition may preferably be applied by spray application. Other techniques include roll application or mixing and/or tumbling the collection of matter with the binder composition. As water evaporates the binder composition forms a gel that bonds the particulate material together when arranged into a desirable assembly as detailed further herein below. When curing, the reactive binder components are caused to react to form essentially water insoluble macromolecular binder intermingled with matrix polymer. Curing thus imparts increased adhesion, durability and water resistance as compared to uncured binder. Curing may be effected at temperatures between ambient (from about 10 to 25° C.) and up to 280° C.

According to another aspect, the invention covers a process for the preparation of a bonded assembly of fibrous materials or particulate materials by application of binder, curing and water evaporation. The obtained product may then be further processed in suitable process steps to make intermediate or final products, including but not limited to insulation products. More specifically, a process for the manufacturing of an assembly of fibers or cellulosic particles may comprise the successive or concomitant application of the relevant components of the binder composition described here above or the application of an aqueous binder composition as previously described onto a collection of fibers or particles; the gathering of the coated fibers or particles in an assembly; and curing whereby the carbohydrate and ammonium salt components are caused to react to form a macromolecular binder, and evaporating water.

Figure 2:
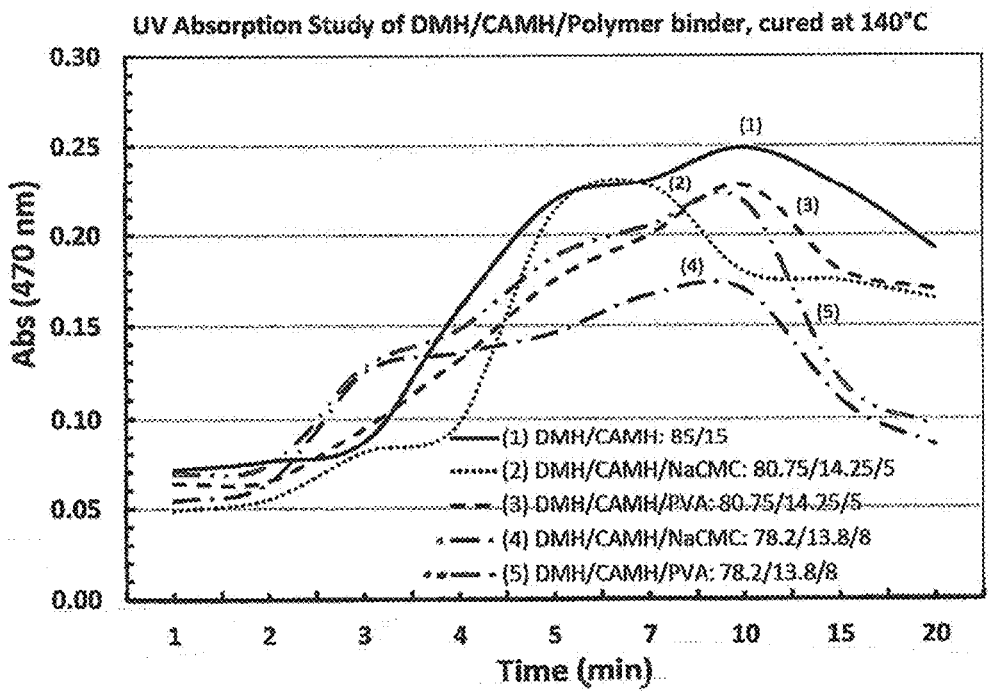
Figure 3:
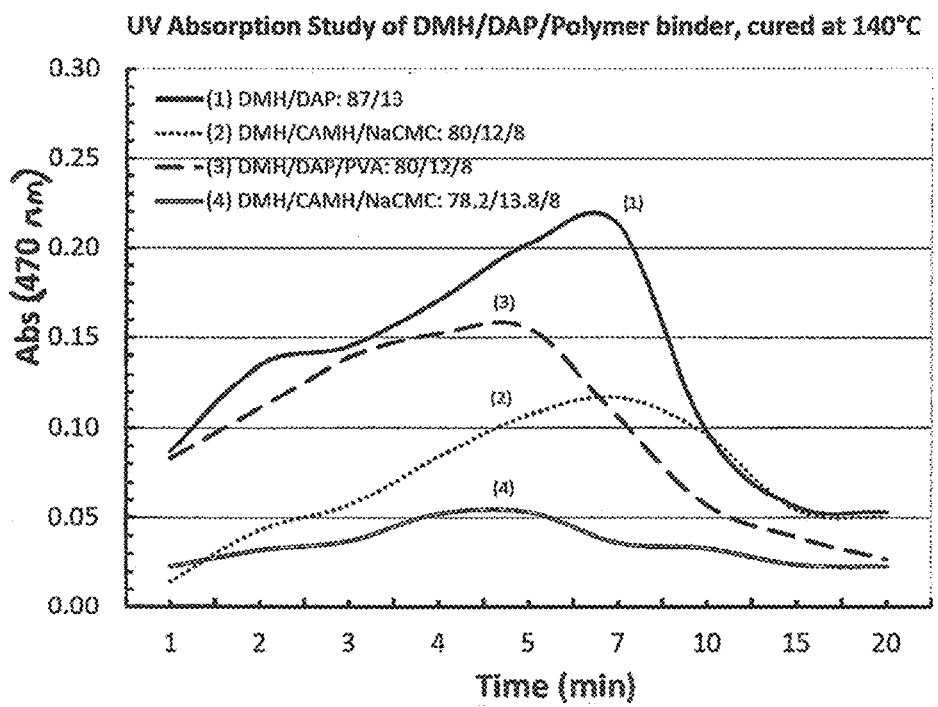
Figure 4A:
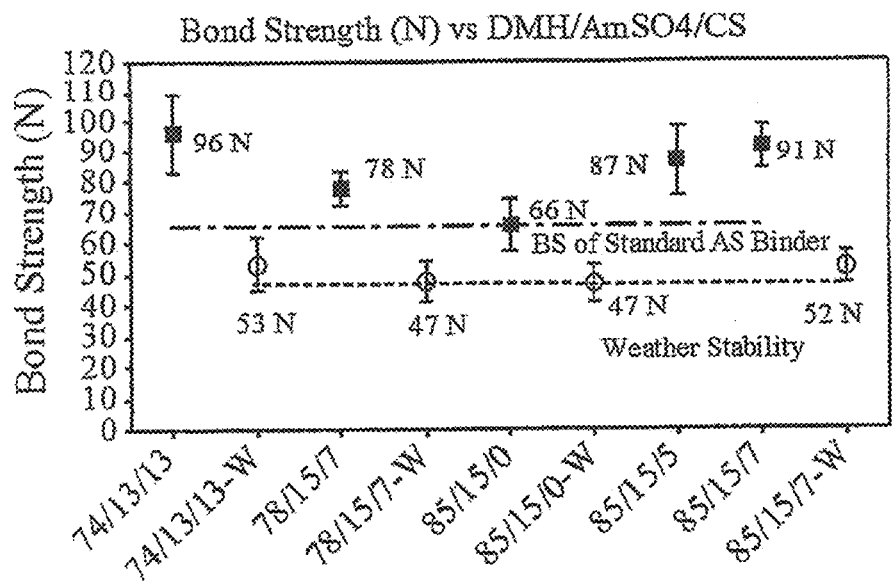
FIG. 4a—dextrose/ammonium sulphate/chitosan ($M_w$60 kDa-220 kDa)
Figure 4B:
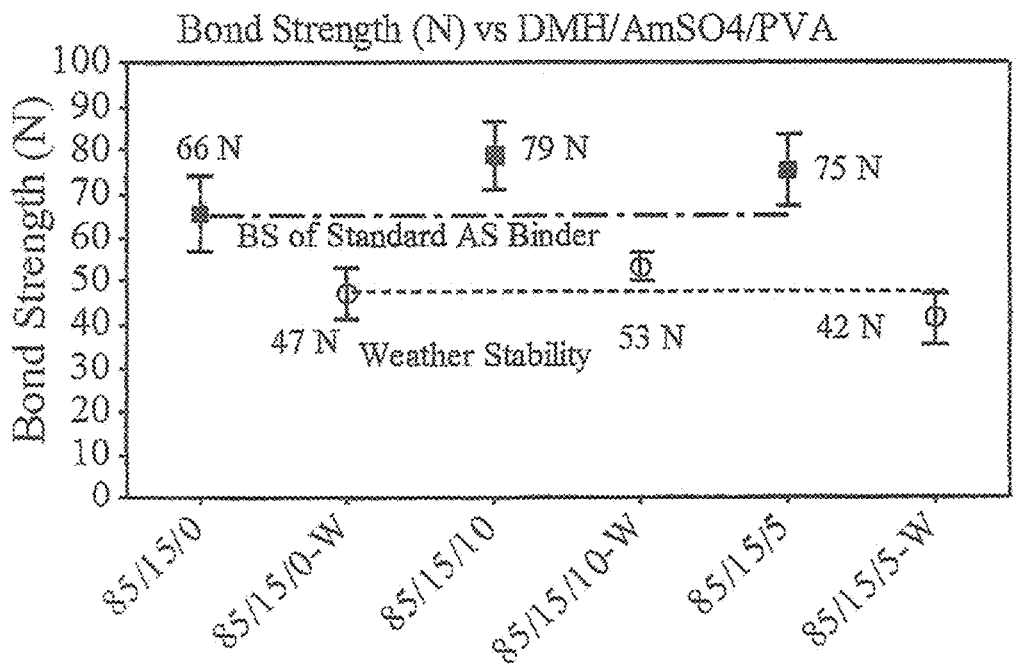
FIG. 4b—dextrose/ammonium sulphate/partially hydrolysed PVA ($M_w$30 kDa-70 kDa), FIG. 4c—dextrose/ammonium sulphate/carboxymethyl cellulose ($M_w$~250 kDa)
Figure 5:
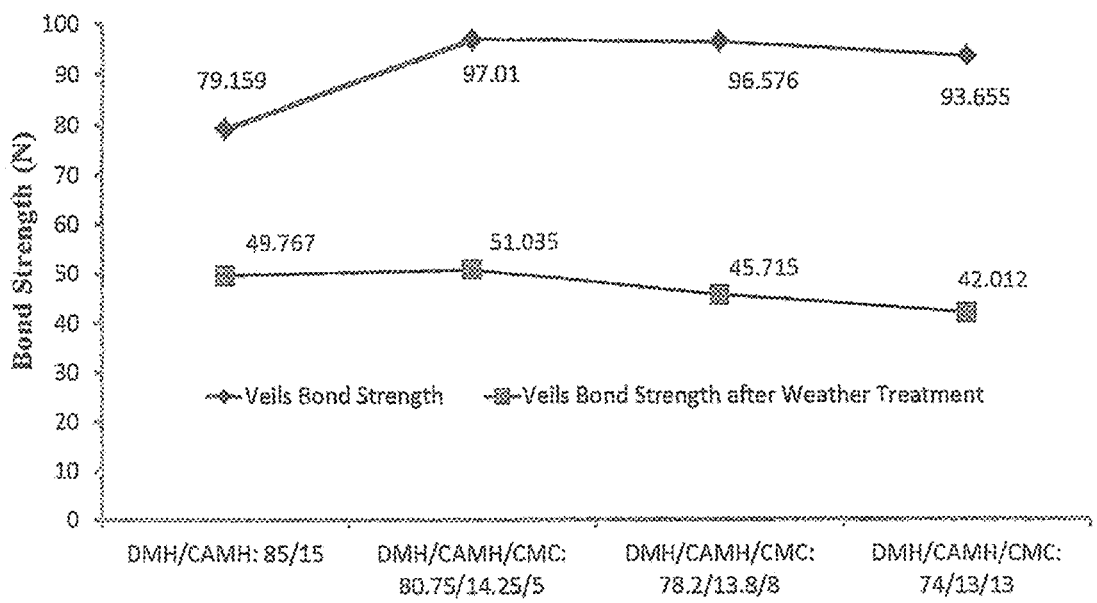
FIG. 5 shows the bond strength before and after weathering for dextrose/citric acid/polymer based binder compositions.
Figure 6A:
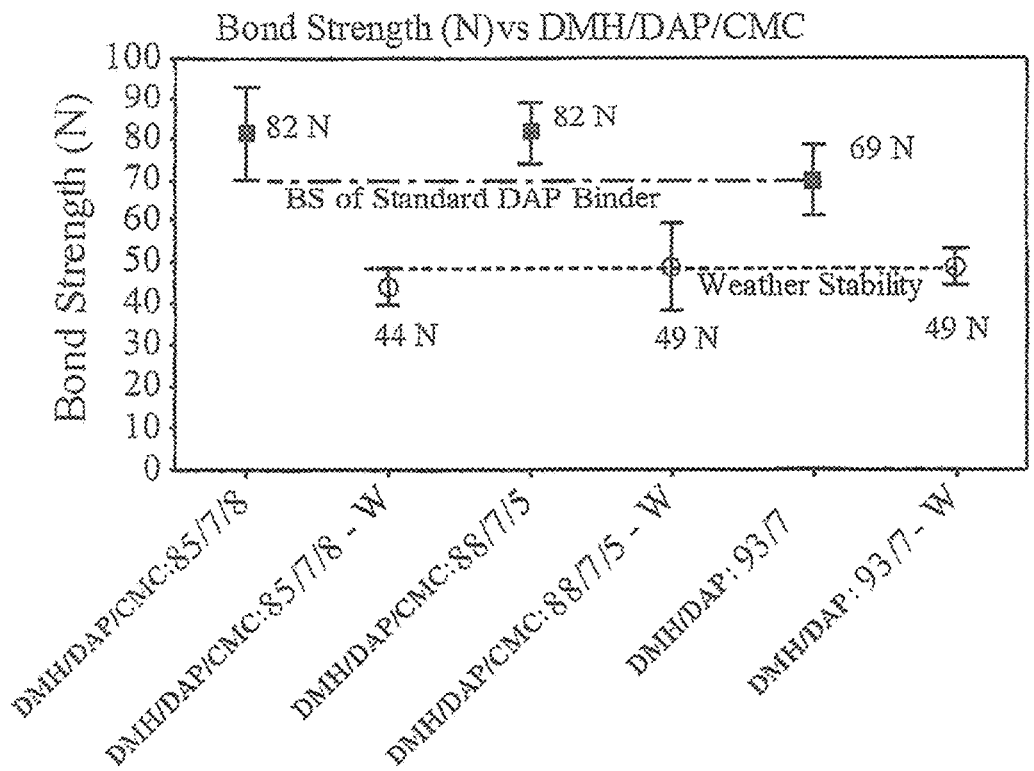
FIG. 6a—dextrose/diammonium phosphate/carboxymethyl cellulose ($M_w$~250 kDa), FIG. 6b—dextrose/diammonium phosphate/chitosan ($M_w$60 kDa-220 kDa), FIG. 7a—dextrose/diammonium phosphate/carboxymethyl cellulose ($M_w$~250 kDa), FIG. 7b—dextrose/diammonium phosphate/partially hydrolysed PVA ($M_w$30 kDa-70 kDa), FIG. 7c—dextrose/diammonium phosphate/chitosan ($M_w$60 kDa-220 kDa).
Figure 6B:
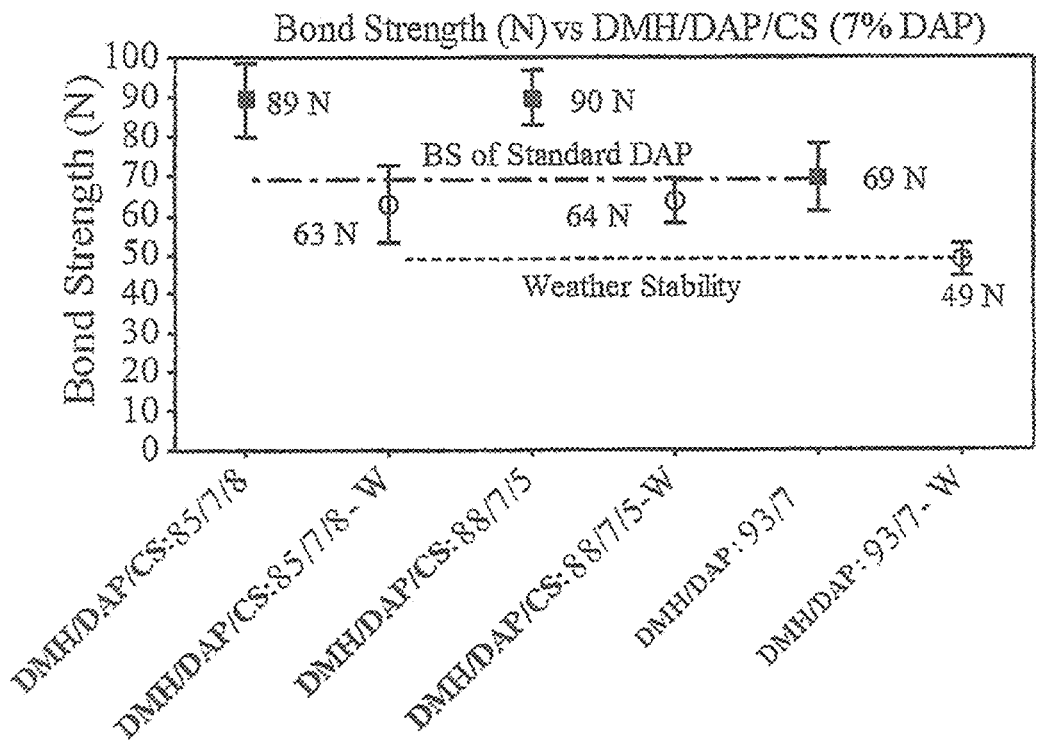
FIGS. 6 and 7 show the bond strength before and after weathering for dextrose/diammonium phosphate/polymer based binder compositions.
Figure 7A:
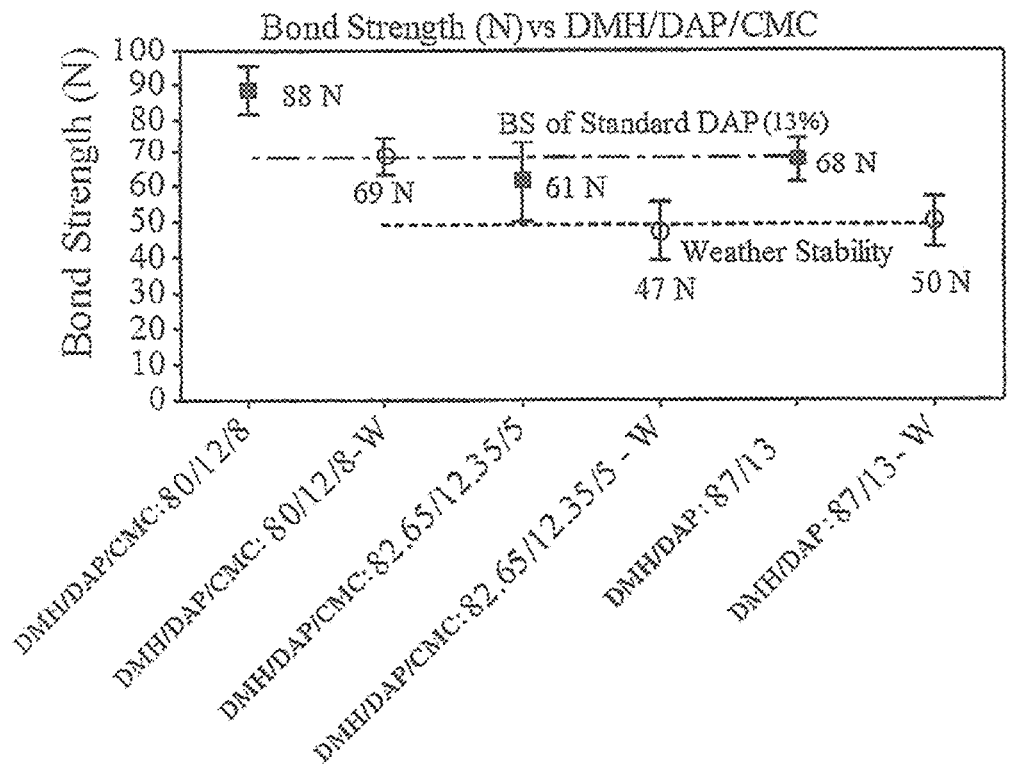
Figure 7B:
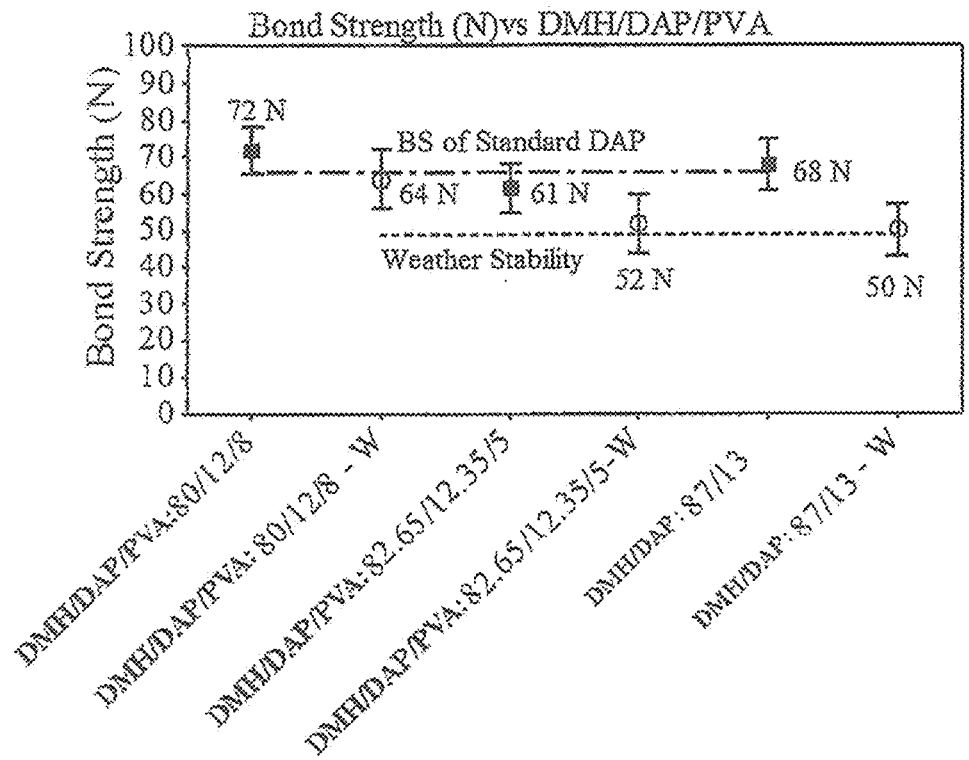
Figure 7C:
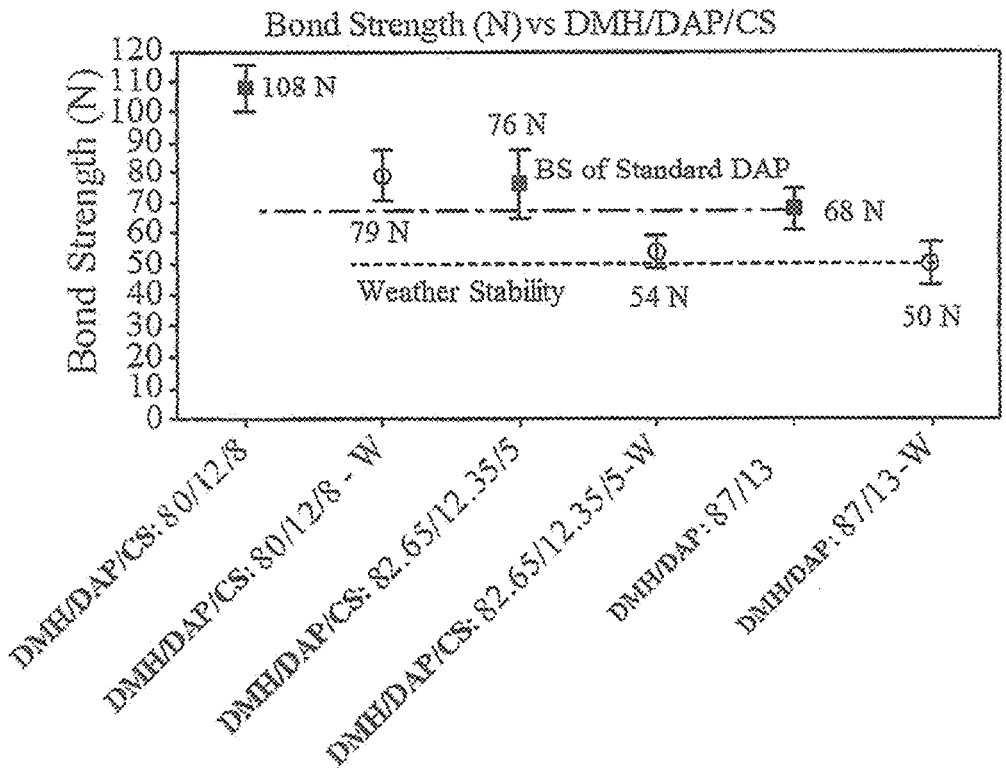

Curing may be effected at a temperature ranging from 90-200° C., preferably higher than 140° C., more preferably lower than 190° C., typically between 160 and 180° C. In the manufacture of wood boards, curing is performed while the material is subjected to pressing The invention will be explained in more details in the examples below with reference to the attached Figures, in which:

FIGS. 1-3 show the cure rate of several binder compositions;

FIG. 4 shows the bond strength before and after weathering for dextrose/ammonium sulphate/polymer based binder compositions;

FIG. 5 shows the bond strength before and after weathering for dextrose/citric acid/polymer based binder compositions; and FIGS. 6 and 7 show the bond strength before and after weathering for dextrose/diammonium phosphate/polymer based binder compositions.

In the following, examples, the following matrix polymers have been used:

Carboxymethyl cellulose (Na CMC)—Mw of approx. 250 kDa
Hydroxypropyl cellulose (HPC)—Mw of approx. 100 kDa
Hydroxyethyl cellulose (HEC)—Mw of approx. 250 kDa
Chitosan (CS)—Mw in the range 60 kDa-220 kDa
Partially hydrolysed PVA—Mw in the range of 30 kDa-70 kDa.

Preparation of Binder Compositions

The required amount of matrix polymer was dissolved in water. Similarly, the required amount of dextrose monohydrate (DMH) was dissolved in water separately, followed by addition of ammonium sulphate (AmSO4), diammonium phosphate (DAP) or citric acid monohydrate (CAMH) with constant stirring, as the case may be. Then the desired amount of polymer solution was added to the mixture of DMH solution or vice versa. The mixture was vigorously stirred in order to obtain a homogenous solution, followed by addition of other additives into the solution if applicable and vigorous stirring.

Determination of Cure Rate

A 50 μL sample of binder solution was dispensed onto a spot of a Whatman™ glass microfiber filter surface. Samples were kept on the top shelf in an oven, avoiding high moisture content inside the oven during curing. For each binder solution, samples were cured for different time periods ranging from 1 minute up to 20 minutes, at different temperatures. After curing, each glass filter sample was cut and fully immersed in 50 mL cold water in a 150 mL glass beaker, and then sonicated for 15 minutes at room temperature. The extract solution was filtered and the absorbance of the extract was determined with a spectrophotometer at 470 nm. The absorbance was plotted as a function of cure time. The results of various binder compositions are presented in FIGS. 1-3. As shown in FIG. 1, the matrix polymer addition to DMH/AmSO4 binder compositions shows no significant effect on the cure rate. The addition of matrix polymer to CAMH based binder compositions (FIG. 2) and DAP based binder compositions (FIG. 3) accelerated curing as demonstrated in FIGS. 2 and 3.

Determination of Bond Strength Before and After Weathering

Commercial PF (phenol formaldehyde) impregnated (A4 size) glass fiber veils were placed into a muffle furnace oven for 30 minutes at 600° C. in order to burnout the PF binder, and were then allowed to cool for 30 minutes. The obtained veil samples were weighted.

Approx. 400 g binder solution samples were poured into dip trays, and the obtained veil samples carefully fully immersed into the relevant binder solutions. The impregnated veils were cured at desired temperature for desired periods of time. Binder content was then measured and bond strength determined as follows.

The bond strength of the relevant cured binder impregnated veils was determined by means of a testometric machine (M350-10CT). For each test a cured binder impregnated A4 veil was cut into 8 equal strips. Each strip was tested separately using a 50 Kg load cell (DBBMTCL-50 kg) at an automated test speed of 10 mm/min controlled by winTest Analysis software. Glass veil tensile plates were attached to the testometric machine in order to ensure a 100 mm gap between plates. Samples were placed vertically in the grippers; and the force was tarred to zero. Various parameters such as maximum load at peak, stress at peak and modulus (stiffness) were evaluated by the software, and data presented as an average of 8 samples with standard deviation. The average maximum load at peak or stress at peak defined as the bond strength.

Cured binder impregnated veils were placed in an autoclave (J8341, Vessel: PV02626 with associated safety valve, door interlock and integrated pipework) system. Samples were treated at 90% humidity and at a temperature ranging from 40° C. to 110° C. (full cycle), at a pressure of up to 2.62 bar, for 3 hours. The samples were dried completely in order to ensure no moisture remains onto the veils. The autoclave treated samples were tested for bond strength by means of testometric machine (M350-10CT) described here above, and the results were compared with those of untreated samples.

The evaluation of bond strength was investigated for the veils impregnated with various binder compositions—see FIGS. 4-7. These impregnated veils were cured at 190° C. for 20 minutes and mechanical tests were performed at dry conditions.

Figure 4C:
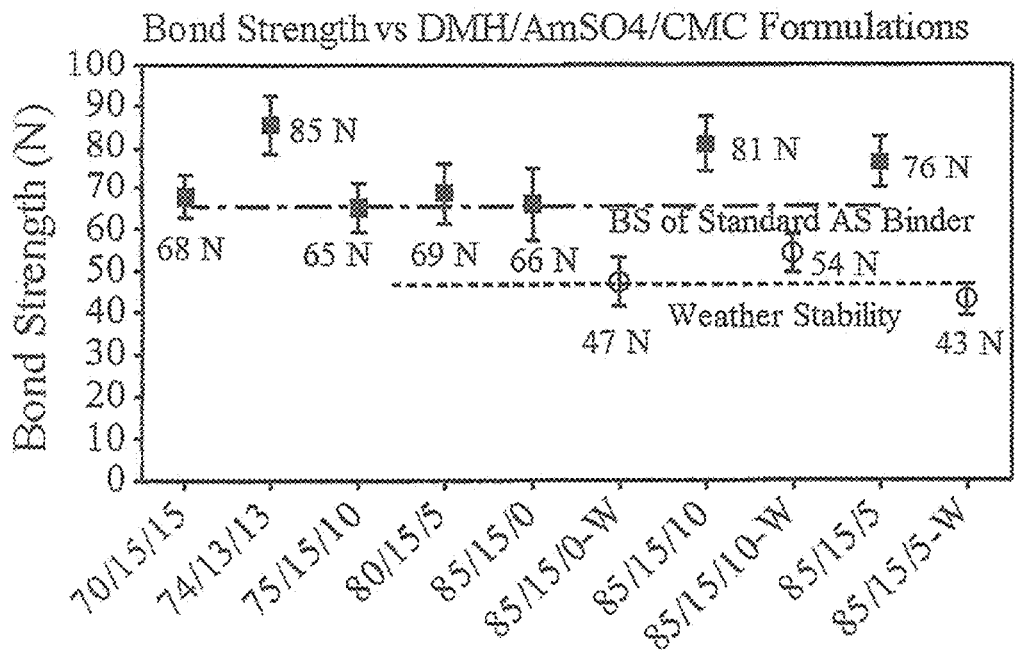
FIG. 4 shows the bond strength before and after weathering for dextrose/ammonium sulphate/polymer based binder compositions.

In FIG. 4, the results for the following binder compositions are shown: DMH/AmSO4/CS, DMH/AmSO4/NaCMC and DMH/AmSO4/PVA. The bond strength was found to be ~66N for DMH/AmSO4 (85/15), when CS was added into the binder composition, the bond strength increased significantly. More specifically, the bond strength increased to 96N for DMH/AmSO4/CS (74/13/13) which is 45% higher bond strength as compared to that of DMH/AmSO4(85/15) binder (FIG. 4a). Similarly the bond strength of DMH/AmSO4/NaCMC (particularly for the ratios of 74/13/13, 85/15/10 and 85/15/5) was higher than for DMH/AmSO4 (85/15) (FIG. 4c). In the figures, the values presented in each graph are average values for the corresponding formulations. The dotted lines represent bond strength of binder composition containing no additional matrix polymer.

Bond Strength After Weathering Was Not Significantly Increased by Addition of Matrix Polymer FIG. 5 shows the bond strength results of various DMH/CAMH/NaCMC binder compositions impregnated into glass fiber veils. When NaCMC (5%) was added into the citric acid based composition, the bond strength increased by ~23% (FIG. 5). Increase of the NaCMC concentration in the binder composition (DMH/CAMH/NaCMC) does not significantly affect the bond strength.

FIG. 6 shows the bond strength before and after extreme weather treatment. The study was performed with 7% DAP, and the ratio of DMH/polymer was varied. Results (FIG. 6) indicate the bond strength of DMH/DAP (93/7) is increased by addition of CMC or CS matrix polymer. When adding more matrix polymer into the binder composition (93/7), the bond strength remains essentially steady within the range.

The weather stability bond strength of all these DMH/DAP/NaCMC and DMH/DAP/CS compositions was also investigated, and the results are plotted in FIG. 6 too. Results indicate that CS significantly increases the weather stability (compare DMH/DAP/CS to DMH/DAP (93/7)).

FIG. 7 shows the bond strength of DMH/DAP/Polymer compositions before and after full cycle autoclaving: (a) DMH/DAP/NaCMC, (b) DMH/DAP/PVA and (c) DMH/DAP/CS. The values presented in each graph are the average values of the corresponding compositions. The DAP concentration was kept constant (12-13%). Results indicate that both NaCMC and CS significantly increase the bond strength as well as improved the weather stability as compared to that of DMH/DAP (87/13).

Binder Weight Loss Upon Curing

Binder solutions were prepared as described above and weighted samples showing a solids content of 2-5% were poured into aluminium petri dishes and kept in an oven for 2 hours at 140° C. The theoretical and experimental values were determined and the weight loss was calculated. The results obtained for various compositions are shown in Table 1 below. As can be seen, the binder weight loss is significantly reduced with addition of matrix polymer in the compositions.

TABLE 1

Binder weight loss upon curing at 140° C. for 2 hours.

| Formulations (wt. %) | Binder Weight Loss (%) |
|---|---|
| 85% DMH + 15% AmSO4 | 31.52 |
| 80% DMH + 15% AmSO4 + 5% NaCMC | 22.76 |
| 75% DMH + 15% AmSO4 + 10% NaCMC | 16.67 |
| 70% DMH + 15% AmSO4 + 15% NaCMC | 8.46 |
| 80% DMH + 15% AmSO4 + 5% CS | 26.76 |
| 80% DMH + 15% AmSO4 + 5% PVA | 21.65 |
| 85% DMH + 15% CAMH | 32.75 |
| 80.75% DMH + 14.25% CAMH + 5% NaCMC | 23.98 |
| 80.75% DMH + 14.25% CAMH + 5% PVA | 24.72 |
| 78.2% DMH + 13.8% CAMH + 8% NaCMC | 23.59 |
| 78.2% DMH + 13.8% CAMH + 8% PVA | 24.68 |
| 85% DMH + 15% CAMH | 32.75 |
| 87% DMH + 13% DAP | 32.44 |
| 80% DMH + 12% DAP + 8% NaCMC | 27.27 |
| 80% DMH + 12% DAP + 8% PVA | 29.37 |
| 82.65% DMH + 12.35% DAP + 5% CS | 27.97 |

Water Absorption 100 g of binder solutions were prepared with desired solid content. Glass microfiber filter GFA were completely immerged and kept for 10 seconds in the relevant binder solutions, and then removed. The binder impregnated GFA samples were cured at desired temperatures, e.g. at 180-190° C. for 10 minutes, and the weight was measured (4 decimal point). Thereafter, the cured GFA samples were fully immerged into a beaker filled with 200 mL water. The samples were maintained for 1 hour under water by means of a glass rod. After 1 hour, the GFA samples were withdrawn and the surface water was absorbed by absorbent paper. The weight of the wet GFA sample was measured. The percentage of water absorption was determined for each sample in three replicates according to the following relationship.

% Water absorption=[(Mass of GFA wet−Mass of GFA dry)/Mass of GFA dry]×100

Table 2 represents water absorption (%) for various compositions of DMH/AmSO4/Polymer, DMH/CAMH/Polymer and DMH/DAP/Polymer, with and without additive (silicone). It can be seen that water absorption is about 247% for standard known DMH/AmSO4 (85/15) binder. With the addition of matrix polymer such as NaCMC and CS the water absorption is significantly reduced, depending on the type and ratio of the matrix polymer used in the formulation. The addition of silicone (1% or 1.5%) in the composition further reduces water absorption significantly.

TABLE 2

Water absorption (%) of DMH/AmSO4/Polymer, DAP/CAMH/Polymer and DMH/DAP/Polymer binders.

| DMH/AmSO4/Polymer Formulation | Water Absorption (%) | STDEV (+/−) |
|---|---|---|
| DMH/AmSO4: 85/15 | 246.64 | 6.37 |
| DMH/AmSO4/NaCMC: 85/15/5 | 210.32 | 0.47 |
| DMH/AmSO4/NaCMC/Silicone: 85/15/5/1 | 144.85 | 10.49 |
| DM H/AmSO4/NaClVlC/Silicone: 85/15/5/1.5 | 115.36 | 5.71 |
| DMH/AmSO4/NaCMC/Silicone: 85/15/5/3.0 | 109.47 | 1.36 |
| DMH/AmSO4/NaCMC: 85/15/10 | 153.05 | 7.36 |
| DMH/AmSO4/NaCMC/Silicone: 85/15/10/1 | 134.75 | 3.52 |
| DMH/AmSO4/NaCMC/Silicone: 85/15/10/1.5 | 112.97 | 8.42 |
| DMH/AmSO4/NaCMC/Silicone: 85/15/10/3.0 | 119.52 | 10.96 |

TABLE 2-continued

Water absorption (%) of DMH/AmSO4/Polymer, DAP/CAMH/Polymer and DMH/DAP/Polymer binders.

| DMH/AmSO4/Polymer Formulation | Water Absorption (%) | STDEV (+/−) |
|---|---|---|
| DMH/AmSO4/NaCMC 74/13/13 | 112.67 | 7.77 |
| DMH/AmSO4/NaCMC/Silicone: 74/13/13/1 | 130.45 | 6.55 |
| DMH/AmSO4/NaCMC/Silicone: 74/13/13/1.5 | 116.80 | 9.78 |
| DMH/AmSO4/NaCMC/Silicone: 74/13/13/3.0 | 143.62 | 1.66 |
| DMH/AmSO4/CS: 85/15/5 | 198.62 | 8.98 |
| DMH/AmSO4/CS/Silicone: 85/15/5/1 | 76.92 | 0.97 |
| DMH/AmSO4/CS: 85/15/10 | 145.25 | 5.78 |
| DMH/AmSO4/CS/Silicone: 85/15/10/1 | 82.65 | 4.73 |
| DMH/AmSO4/CS/Silicone: 85/15/10/1.5 | 79.76 | 0.56 |
| DMH/CAMH/Polymer Formulation | | |
| DMH/CAMH: 85/15 | 273.55 | 5.39 |
| DMH/CAMH/NaCMC: 80.75/14.25/5 | 224.65 | 8.30 |
| DMH/CAMH/NaCMC/Silicone: 80.75/14.25/5/1 | 76.33 | 4.43 |
| DMH/CAMH/NaCMC: 78.2/13.8/8 | 190.18 | 12.62 |
| DMH/CAMH/NaCMC/Silicone: 78.2/13.8/8/1 | 83.97 | 6.38 |
| DMH/CAMH/NaCMC: 74/13/13 | 143.25 | 17.68 |
| DMH/CAMH/NaCMC/Silicone: 74/13/13/1 | 125.34 | 3.57 |
| DMH/CAMH/HEC: 74/13/13 | 198.23 | 7.78 |
| DMH/CAMH/HEC/Silicone: 74/13/13/1 | 77.25 | 6.39 |
| DMH/CAMH/HEC/Silicone: 74/13/13/3 | 76.35 | 7.56 |
| DMH/DAP/Polymer Formulation | | |
| DMH/DAP: 87/13 | 261.61 | 4.62 |
| DMH/DAP/NaCMC: 80/12/8 | 203.96 | 7.37 |
| DMH/DAP/PVA: 80/12/8 | 231.99 | 10.75 |

Binder solutions comprising 2% solids were prepared according to the method disclosed above and showed the compositions indicated in the tables below. Bond strength of weathered and unweathered veils impregnated with the relevant binder compositions and cured for 8 minutes at 200° C. were measured as disclosed above. The results are summarized in the tables below, averaged over 8 replicates.

TABLE 3

| Binder Formulations | Bond strength of veils, unweathered | | Bond strength after weather treatment | |
|---|---|---|---|---|
| | Average Bond Strength (N) | STDEV (+/−) | Average Bond Strength (N) | STDEV (+/−) |
| 85% DMH + 15% AmSO4 (control) | 63.347 | 10.896 | 36.847 | 7.001 |
| 84% DMH + 15% AmSO4 + 1% CS | 63.930 | 4.880 | 36.278 | 4.683 |
| 83% DMH + 15% AmSO4 + 2% CS | 71.741 | 9.679 | 40.750 | 11.168 |
| 82% DMH + 15% AmSO4 + 3% CS | 73.794 | 7.956 | 41.389 | 6.299 |
| 81% DMH + 15% AmSO4 + 4% CS | 74.638 | 3.456 | 42.615 | 4.071 |
| 80% DMH + 15% AmSO4 + 5% CS | 78.263 | 7.636 | 45.519 | 7.849 |

TABLE 4

| Binder Formulations | Bond strength of veils, unweathered | | Bond strength after weather treatment | |
|---|---|---|---|---|
| | Average Bond Strength (N) | STDEV (+/−) | Average Bond Strength (N) | STDEV (+/−) |
| 49.73% DMH + 35.28% Fructose + 15% AmSO4 (control) | 65.56 | 8.86 | 49.13 | 12.91 |
| 49.14% DMH + 34.16% Fructose + 15% AmSO4 + 1% CS | 77.22 | 8.04 | 56.87 | 10.69 |
| 48.56% DMH + 34.44% Fructose + 15% AmSO4 + 2% CS | 80.63 | 5.39 | 53.80 | 9.84 |
| 47.97% DMH + 34.03% Fructose + 5% AmSO4 + 3% CS | 89.95 | 8.92 | 55.39 | 7.74 |
| 47.39% DMH + 33.61% Fructose + 15% AmSO4 + 4% CS | 90.35 | 10.59 | 55.46 | 5.87 |
| 46.8% DMH + 33.2% Fructose + 15% AmSO4 + 5% CS | 93.36 | 10.44 | 55.45 | 4.20 |

TABLE 5

| Binder Formulations | Bond strength of veils unweathered | | Bond strength after weather treatment | |
|---|---|---|---|---|
| | Average Bond Strength (N) | STDEV (+/−) | Average Bond Strength (N) | STDEV (+/−) |
| 93% DMH + 7% DAP (control) | 61.879 | 5.623 | 47.517 | 7.113 |
| 92% DMH + 7% DAP + 1% CS | 76.365 | 11.618 | 62.671 | 7.041 |
| 91% DMH + 7% DAP + 2% CS | 77.228 | 19.285 | 71.698 | 9.090 |
| 90% DMH + 7% DAP + 3% CS | 80.586 | 7.494 | 65.023 | 6.975 |
| 89% DMH + 7% DAP + 4% CS | 83.593 | 3.745 | 63.070 | 6.317 |

TABLE 5-continued

| Binder Formulations | Bond strength of veils unweathered | | Bond strength after weather treatment | |
|---|---|---|---|---|
| | Average Bond Strength (N) | STDEV (+/−) | Average Bond Strength (N) | STDEV (+/−) |
| 88% DMH + 7% DAP + 5% CS | 85.106 | 8.047 | 68.655 | 5.123 |
| 87% DMH + 13% DAP | 63.593 | 3.692 | 56.608 | 7.624 |
| 86% DMH + 13% DAP + 1% CS | 83.311 | 4.994 | 56.714 | 9.745 |
| 85% DMH + 13% DAP + 2% CS | 82.974 | 7.375 | 68.743 | 9.176 |
| 84% DMH + 13% DAP + 3% CS | 91.810 | 13.908 | 74.988 | 6.892 |

The data clearly shows the beneficial effect of chitosan polymer matrix (CS) addition to the hydrocarbon based binder compositions.

The experiments were repeated with binder compositions comprising 2% solids. The compositions are shown in the tables below and comprise a polyazetidinium (CA1025) as polymer matrix. Bond strength of weathered and unweathered veils impregnated with the relevant binder compositions and cured for 8 minutes at 200° C. were measured as disclosed above. The results are summarized in Table 6 below, averaged over 8 replicates.

TABLE 6

| Binder Formulations | Bond strength of veils unweathered | | Bond strength after weather treatment | |
|---|---|---|---|---|
| | Average Bond Strength (N) | STDEV (+/−) | Average Bond Strength (N) | STDEV (+/−) |
| 85% DMH + 15% AmSO4 | 66.812 | 4.145 | 52.123 | 4.542 |
| 84% DMH + 15% AmSO4 + 1% CA1025 | 76.345 | 11.167 | 63.410 | 5.393 |
| 83% DMH + 15% AmSO4 + 2% CA1025 | 91.245 | 6.388 | 60.231 | 10.250 |
| 82% DMH + 15% AmSO4 + 3% CA1025 | 86.144 | 8.922 | 61.076 | 13.230 |
| 81% DMH + 15% AmSO4 + 4% CA1025 | 85.144 | 11.654 | 59.530 | 6.549 |
| 80% DMH + 15% AmSO4 + 5% CA1025 | 90.640 | 15.134 | 59.614 | 4.720 |
| 85% DMH + 15% CAMH | 84.766 | 6.047 | 59.569 | 10.650 |
| 84% DMH + 15% CAMH + 1% CA1025 | 116.151 | 8.766 | 103.040 | 15.460 |
| 83% DMH + 15% CAMH + 2% CA1025 | 113.480 | 12.390 | 99.004 | 19.273 |
| 82% DMH + 15% CAMH + 3% CA1025 | 108.101 | 9.386 | 93.758 | 14.468 |
| 81% DMH + 15% CAMH + 4% CA1025 | 113.229 | 11.863 | 96.023 | 11.444 |
| 93% DMH + 7% DAP | 73.499 | 6.763 | 61.000 | 10.738 |
| 92% DMH + 7% DAP + 1% CA1025 | 76.266 | 9.219 | 65.361 | 12.090 |
| 91% DMH + 7% DAP + 2% CA1025 | 86.489 | 5.461 | 68.984 | 10.122 |
| 90% DMH + 7% DAP + 3% CA1025 | 87.264 | 10.278 | 69.571 | 9.345 |
| 89% DMH + 7% DAP + 4% CA1025 | 87.280 | 6.899 | 66.944 | 8.225 |
| 87% DMH + 13% DAP | 67.843 | 7.629 | 59.438 | 6.947 |
| 86% DMH + 13% DAP + 1% CA1025 | 73.781 | 15.805 | 82.893 | 7.693 |
| 85% DMH + 13% DAP + 2% CA1025 | 87.873 | 6.696 | 83.829 | 8.665 |
| 84% DMH + 13% DAP + 3% CA1025 | 88.965 | 13.690 | 85.755 | 14.067 |
| 83% DMH + 13% DAP + 4% CA1025 | 88.611 | 7.886 | 85.308 | 8.783 |

Again, the effect on bond strength of the addition of CA1025 is clearly evidenced.
DMH: dextrose monohydrate
AmSO4: ammonium sulphate
DAP: Diammonium phosphate
CS: High molecular weight chitosan from Sigma Aldrich, CAS n° 9012-76-4 (419419)
CaMH: citric acid monohydrate
CA1025: trade name of a commercially available azetidinium polymer The experiments were repeated with binder compositions as shown in Table 7 below. Bond strength of weathered and unweathered veils impregnated with the relevant binder compositions and cured for 8 minutes at 200° C. were determined as disclosed above. The results averaged over 8 replicates are shown in Table 7 below.

TABLE 7

| Binder Formulations | Bond Strength of Veils Unweathered | | Bond Strength of Veils after weather treatment | |
|---|---|---|---|---|
| | Average Bond Strength (N) | STDEV (+/−) | Average Bond Strength (N) | STDEV (+/−) |
| 85% DMH + 15% HMDA | 72.843 | 7.760 | 59.972 | 10.264 |
| 80% DMH + 15% HMDA + 5% HPC | 67.175 | 6.859 | 53.989 | 5.306 |

TABLE 7-continued

| Binder Formulations | Bond Strength of Veils Unweathered | | Bond Strength of Veils after weather treatment | |
|---|---|---|---|---|
| | Average Bond Strength (N) | STDEV (+/−) | Average Bond Strength (N) | STDEV (+/−) |
| 80% DMH + 15% HMDA + 5% NaCMC | 93.310 | 7.224 | 77.060 | 6.285 |
| 80% DMH + 15% HMDA + 5% CA1025 | 85.703 | 9.744 | 88.180 | 7.190 |
| 75% DMH + 15% HMDA + 10% CA1025 | 85.419 | 12.881 | 93.776 | 7.381 |

DMH: dextrose monohydrate
HMDA: hexamethylene diamine
HPC: hydroxypropyl cellulose
CA1025: trade name of a commercially available azetidinium polymer
Clearly, bond strength of weathered and unweathered veils is essentially maintained or even increased despite reduced dextrose available for reaction with HMDA cross-linker.

Accorder to further aspects, the present invention provides an aqueous curable binder composition, an assembly of fibers or particles and a process as set out in the following aspects:

Aspect 1. An aqueous curable binder composition comprising starting materials required for forming a thermoset resin upon curing and a matrix polymer.

Aspect 2. The aqueous curable binder composition of aspect 1 comprising a polyhydroxy component, a polycarboxylic acid component, or an anhydride, ester or salt derivative thereof for forming a thermoset resin upon curing, and a matrix polymer.

Aspect 3. The aqueous curable binder composition of aspect 2 wherein the polycarboxylic acid component is selected from monomeric and polymeric polycarboxylic acids.

Aspect 4. The aqueous curable binder composition of aspect 4 wherein the polycarboxylic acid component is a monomeric polycarboxylic acid, such as dicarboxylic acid, including, but not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, or, tricarboxylic acid, including, but not limited to, unsaturated aliphatic tricarboxylic acids, saturated aliphatic tricarboxylic acids, aromatic tricarboxylic acids, unsaturated cyclic tricarboxylic acids, saturated cyclic tricarboxylic acids, hydroxy-substituted derivatives thereof, preferably citric acid, and mixtures thereof.

Aspect 5. The aqueous curable binder composition of aspect 2 wherein the salt derivative of the polycarboxylic acid component is an ammonium salt.

Aspect 6. The aqueous curable binder composition of any of the preceding aspects wherein the polyhydroxy component is a carbohydrate component selected from monosaccharide in its aldose or ketose form, including a triose, a tetrose, a pentose, a hexose, or a heptose; or a polysaccharide or an oligosaccharide; or a component that yields one or more reducing sugars in situ, or combinations thereof.

Aspect 7. The aqueous curable binder composition of aspect 1 comprising a carbohydrate component and a nitrogen containing component for forming a thermoset resin upon curing, and a matrix polymer.

Aspect 8. The aqueous curable binder composition of aspect 7 wherein the carbohydrate component is selected from monosaccharide in its aldose or ketose form, including a triose, a tetrose, a pentose, a hexose, or a heptose; or an oligosaccharide or a polysaccharide; or a component that yields one or more reducing sugars in situ, or combinations thereof.

Aspect 9. The aqueous curable binder composition of any of aspects 7 or 8 wherein the nitrogen containing component is an ammonium salt of an inorganic acid, selected from phosphoric, sulphuric, nitric and carbonic acid, preferably ammonium sulphate or ammonium phosphate.

Aspect 10. The aqueous curable binder composition of any of aspects 7 or 8 wherein the nitrogen containing component is selected from polyamine functional compounds comprising primary and/or secondary and/or tertialy and/or quaternary amine functional groups.

Aspect 11. The aqueous curable binder composition of any of aspect 10 wherein the polyamine functional compound has the formula of $H_2N$-Q-$NH_2$, wherein Q is an alkyl, cycloalkyl, heteroalkyl, or cycloheteroalkyl, each of which optionally substituted.

Aspect 12. The aqueous curable binder composition of aspect 11 wherein the polyamine functional compound is selected from di-amine, tri-amine, tetra-amine, and penta-amine, more specifically 1,6-diaminohexane and 1,5-diamino-2-methylpentane, diethylenetriamine, 1-piperazineethaneamine, and bis(hexamethylene)triamine, triethylenetetramine, tetraethylenepentamine, polyethyleneimine (PEI), polyninyl amine, polyether amine, polylysine.

Aspect 13. The aqueous curable binder composition of any of the preceding aspects wherein the matrix polymer is selected from naturally derived polymers, such as polysaccharides, such as cellulose, starch, alginate, hyaluronic acid, and their derivatives, carboxymethyl cellulose (CMC), hydroxypropyl cellulose (HPC), 2-hydroxyethyl cellulose (HEC), synthetically derived polymers, such as polyvinyls (PVA, PVAc, PAN), polyacrylics, polyacrylate, polymethacrylate, polyacrylamide, polymethacrylamides, polyurethanes, polyesters, aliphatic isocyanate oligomers, polyazetidinium, copolymers thereof and mixtures thereof.

Aspect 14. The aqueous curable binder composition of aspect 13 wherein the matrix polymer is selected from cellulose derivatives, such as carboxymethyl cellulose (CMC), hydroxypropyl cellulose (HPC), 2-hydroxyethyl cellulose (HEC); polyvinyl acetate (PVAc), aliphatic isocyanate oligomers, or mixtures thereof.

Aspect 15. The aqueous curable binder composition of any of the preceding aspects wherein the matrix polymer shows a molecular weight ranging from 500 Daltons (Da) to $2\times10^6$ Da, preferably from $1\times10^3$-$5\times10^5$ Da, more preferably from $5\times10^4$ Da-$3\times10^5$ Da.

Aspect 16. The aqueous curable binder composition of any of aspects 7-15 wherein the dry weight ratio of carbohydrate to ammonium salt of inorganic or polycarboxylic acid or polyamine functional compound ranges from about 2 to about 35, preferably from about 2.5 to about 13.

Aspect 17. The aqueous curable binder composition of aspect 16 wherein the matrix polymer makes up from about 1 to 20% of the dry weight of the binder composition, preferably from about 2 to 18% dry weight, more preferably from 5 to 15% dry weight of the composition.

Aspect 18. The aqueous curable binder composition of any of the preceding aspects further comprising dyes, antifungal agents, antibacterial agents, hydrophobes, silicone containing coupling agents and/or other additives known in the art for such binder compositions.

Aspect 19. The aqueous binder composition of any of the preceding aspects wherein a component is selected micro-/or nano-particles derived from natural or synthetic polymers of their combination such as nanocelluloses, or from inorganic materials such as MgO, CaO, $Al_2O_3$ and $CaCO_4$, or nanoclays such as montmorillonite, bentonite, kaolinite, hectorite, and halloysite and other organically-modified nanoclays, and/or mixtures thereof.

Aspect 20. An assembly of fibers or particles bonded with an aqueous curable binder composition according to any of the preceding aspects or with a binder resulting from the curing of any of the curable binder compositions of the preceding aspects.

Aspect 21. The assembly of fibers according to aspect 20 being an insulation product, such as a mineral wool mat or other.

Aspect 22. The assembly of particles according to aspect 20 being a composite wood board, such as wood fiber board, wood particle board, plywood or similar board.

Aspect 23. A process for the manufacturing of an assembly of fibers or particles according to any of aspects 20-22 characterized in that it comprises the successive or concomitant application of the relevant components of the aqueous curable binder composition of any of aspects 1-19, or the application of an aqueous binder composition according to any of aspects 1 to 19 onto a collection of fibers or particles; the gathering of the coated fibers or particles in an assembly; and curing, whereby the components of the aqueous curable binder composition are caused to react to form a macromolecular binder, and evaporating water.

Aspect 24. The process according to aspect 23 characterized in that curing is performed at a temperature ranging from 120° C.-200° C., preferably higher than 140° C., more preferably lower than 190° C., typically between 160 and 180° C.

Aspect 25. The process according to any of aspects 23-24 characterized in that the aqueous binder composition is applied by spraying onto the collection of fibers or particles.

Aspect 26. The process of any of aspects 23 to 25 wherein the assembly is a wood fiber board or wood particle board or similar wood board, subjected to pressing during curing.

The invention claimed is:

1. An aqueous curable binder composition consisting of water, starting materials required for forming a thermoset resin upon curing and a matrix polymer, optionally one or more dyes, antifungal agents, antibacterial agents, hydrophobes, and silicone-containing coupling agents, and optionally a component selected from microparticles, nano-particles, or combinations thereof derived from one or more of MgO, CaO, $Al_2O_3$, $CaCO_4$, nanoclays, montmorillonite, bentonite, kaolinite, hectorite, and halloysite, wherein the starting materials required for forming a thermoset resin upon curing consist of a carbohydrate component selected from the group consisting of reducing sugars and a carbohydrate component capable of producing one or more reducing sugars in situ under thermal curing conditions, and a nitrogen-containing component and/or a reaction product thereof, and wherein the matrix polymer comprises 5-15% of the dry weight of the binder composition, and is selected from the group consisting of carboxymethyl cellulose (CMC), sodium carboxymethyl cellulose (NaCMC), hydroxypropyl cellulose (HPC), 2-hydroxyethyl cellulose (HEC), chitosan, polyurethanes, aliphatic isocyanate oligomers, azetidinium polymer, copolymers thereof and mixtures thereof.

2. The aqueous curable binder composition of claim 1, wherein the nitrogen-containing component is an ammonium salt of an inorganic acid selected from the group consisting of phosphoric acid, sulphuric acid, nitric acid, carbonic acid and combinations thereof.

3. The aqueous curable binder composition of claim 1, wherein the nitrogen-containing component is selected from the group consisting of polyamine functional compounds comprising one or more of a primary, secondary, tertiary and quaternary amine functional group.

4. The aqueous curable binder composition of claim 3, wherein the polyamine functional compound has the general formula of $H_2N$-Q-$NH_2$, wherein Q is an alkylene, cycloalkylene, heteroalkylene, or cycloheteroalkylene, each of which is optionally substituted.

5. The aqueous curable binder composition of claim 3, wherein the polyamine functional compound is selected from one or more of a diamine, triamine, tetramine, pentamine, 1,6-diaminohexane, 1,5-diamino-2-methylpentane, diethylenetriamine, 1-piperazine-ethaneamine, bis(hexamethylene)triamine, triethylenetetramine, tetraethylenepentamine, polyethyleneimine (PEI), polyvinyl amine, polyether amine, and polylysine.

6. The aqueous curable binder composition of claim 1, wherein the matrix polymer has a molecular weight ranging from about 500 Daltons (Da) to about $2\times10^6$ Da.

7. The aqueous curable binder composition of claim 1, wherein the nitrogen-containing component is an ammonium salt of an inorganic acid or is selected from the group consisting of polyamine functional compounds comprising one or more of a primary, secondary, tertiary and quaternary amine functional group, and wherein the dry weight ratio of carbohydrate to ammonium salt of inorganic acid or polyamine functional compound ranges from about 2 to about 35.

8. The aqueous curable binder composition of claim 1, wherein the curable binder composition consists of water, the starting materials required for forming a thermoset resin upon curing, the matrix polymer, and one or more dyes, antifungal agents, antibacterial agents, hydrophobes, and silicone-containing coupling agents.

9. The aqueous curable binder composition of claim 1, wherein the curable binder composition consists of water, the starting materials required for forming a thermoset resin upon curing, the matrix polymer, and a component selected from microparticles, nano-particles, or combinations thereof derived from one or more of MgO, CaO, $Al_2O_3$, $CaCO_4$, nanoclays, montmorillonite, bentonite, kaolinite, hectorite, and halloysite.

10. An assembly of fibers or particles bonded with an aqueous curable binder composition according to claim 1 or with a binder resulting from curing of the curable binder composition of claim 1.

11. The assembly of fibers according to claim 10 being an insulation product that is a mineral wool mat.

12. The assembly of particles according to claim 10 being a composite wood board selected from a wood fiber board, wood particle board, and plywood.

13. A process for the manufacturing of an assembly of fibers or particles according to claim 10, said process comprising: successive or concomitant application of the components of the aqueous curable binder composition of claim 1, or application of an aqueous binder composition according to claim 1, onto a collection of fibers or particles to afford coated fibers or coated particles; gathering the coated fibers or coated particles into an assembly;

and curing the assembly, whereby water is evaporated and the components of the aqueous curable binder composition are caused to react to form a macromolecular binder.

14. The process according to claim 13 characterized in that curing is performed at a temperature ranging from about 90° C. to about 200° C.

15. The process according to claim 13 characterized in that the aqueous binder composition is applied by spraying onto the collection of fibers or particles.

16. The process of claim 13, wherein the assembly is a wood fiber board or wood particle board subjected to pressing during curing.

17. The aqueous curable binder composition of claim 8, wherein the one or more dyes, antifungal agents, antibacterial agents, hydrophobes and silicone-containing coupling agents are present at a concentration from about 0.1 to about 1% by weight based on the weight of solids in the binder composition.

18. The assembly of fibers or particles of claim 10, wherein the assembly comprises one or more of coal, sand, cellulosic fibers, wood shavings, saw dust, wood pulp, ground wood, wood chips, wood strands, wood layers, natural fibers, jute, flax, hemp, straw, wood veneers, facings, woven and non-woven materials.

\* \* \* \* \*